(12) United States Patent
Chau et al.

(10) Patent No.: US 12,553,336 B2
(45) Date of Patent: *Feb. 17, 2026

(54) ADVANCED DRILL STRING COMMUNICATION SYSTEM, COMPONENTS AND METHODS

(71) Applicant: Merlin Technology, Inc., Kent, WA (US)

(72) Inventors: Albert W. Chau, Woodinville, WA (US); Loc Viet Lam, Renton, WA (US)

(73) Assignee: Merlin Technology, Inc., Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/655,324

(22) Filed: May 6, 2024

(65) Prior Publication Data

US 2024/0287894 A1 Aug. 29, 2024

Related U.S. Application Data

(63) Continuation of application No. 17/571,536, filed on Jan. 10, 2022, now Pat. No. 12,012,849.

(51) Int. Cl.
*E21B 47/12* (2012.01)
*E21B 7/04* (2006.01)
(Continued)

(52) U.S. Cl.
CPC .............. *E21B 47/12* (2013.01); *E21B 7/046* (2013.01); *E21B 7/30* (2013.01); *E21B 47/095* (2020.05); *E21B 47/125* (2020.05); *G01V 3/30* (2013.01)

(58) Field of Classification Search
CPC ........ E21B 47/091; E21B 7/046; E21B 47/12; E21B 47/18; G01V 3/30
See application file for complete search history.

(56) References Cited

U.S. PATENT DOCUMENTS

| 4,578,675 A | 3/1986 | MacLeod |
| 5,361,029 A | 11/1994 | Rider et al. |

(Continued)

FOREIGN PATENT DOCUMENTS

| RU | 2175368 C2 | 10/2001 |
| WO | 2000/060777 A1 | 10/2000 |

OTHER PUBLICATIONS

U.S. Appl. No. 13/593,439, filed Aug. 2012, Chau et al.
(Continued)

*Primary Examiner* — Mirza F Alam
(74) *Attorney, Agent, or Firm* — Pritzkau Patent Group LLC; Michael M Pritzkau

(57) ABSTRACT

A drill string communication system is described. An uphole transceiver can couple a signal onto the drill string at a power that is always greater that a selectable power for a downhole signal. Communication from a drill rig to an inground tool can be re-initiated using a maximum uphole transmit power of an uphole transceiver. A procedure can establish a new set of transmission parameters for a drill string signal to establish communication between the drill rig and the inground tool. The system can include a walkover locator that receives an active/inactive status-controlled electromagnetic locating signal. Responsive to a locating signal degradation, a reconfiguration command can modify the locating signal. The uphole transceiver and a downhole transceiver can automatically modify at least one parameter of a downhole signal. An uphole receiver can apply a compensation response to a transferred signal to compensate for a drill string channel transfer function.

3 Claims, 16 Drawing Sheets

(51) Int. Cl.
  *E21B 7/30* (2006.01)
  *E21B 47/095* (2012.01)
  *E21B 47/125* (2012.01)
  *G01V 3/30* (2006.01)

(56) References Cited

U.S. PATENT DOCUMENTS

| | | | |
|---|---|---|---|
| 5,467,083 | A | 11/1995 | McDonald et al. |
| 5,961,252 | A | 10/1999 | Mercer et al. |
| 6,035,951 | A | 3/2000 | Mercer et al. |
| 6,047,783 | A | 4/2000 | Mercer et al. |
| 6,079,506 | A | 6/2000 | Mercer |
| 6,160,401 | A * | 12/2000 | Mercer ............ E21B 47/02224 324/326 |
| 6,223,826 | B1 | 5/2001 | Chau et al. |
| 6,267,185 | B1 | 7/2001 | Mougel et al. |
| 6,285,190 | B1 | 9/2001 | Brune et al. |
| 6,308,787 | B1 | 10/2001 | Alft et al. |
| 6,408,952 | B1 | 6/2002 | Brand et al. |
| 6,496,008 | B1 | 12/2002 | Brune et al. |
| 6,606,032 | B1 | 8/2003 | Fling |
| 6,719,069 | B2 | 4/2004 | Alft et al. |
| 6,756,783 | B2 | 6/2004 | Brune et al. |
| 6,899,178 | B2 * | 5/2005 | Tubel ................ E21B 41/00 166/313 |
| 7,064,676 | B2 * | 6/2006 | Hall .................. E21B 17/028 166/242.6 |
| 7,331,409 | B2 | 2/2008 | Cole et al. |
| 7,607,494 | B2 | 10/2009 | Alft et al. |
| 7,624,816 | B2 | 12/2009 | Cole et al. |
| 7,649,474 | B1 | 1/2010 | Gard |
| 7,737,863 | B2 | 6/2010 | Jin et al. |
| 7,787,525 | B1 * | 8/2010 | Clark, Jr. ............ H04L 27/2608 340/855.4 |
| 2002/0020561 | A1 | 2/2002 | Alft et al. |
| 2002/0105331 | A1 | 8/2002 | Brune et al. |
| 2003/0111268 | A1 * | 6/2003 | Alft .................. E21B 7/046 175/73 |
| 2004/0163822 | A1 | 8/2004 | Zhang et al. |
| 2005/0182870 | A1 | 8/2005 | Steiner et al. |
| 2005/0285753 | A1 | 12/2005 | Shah et al. |
| 2007/0029112 | A1 * | 2/2007 | Li .................... E21B 17/003 175/26 |
| 2008/0285386 | A1 * | 11/2008 | Sinanovic ............ E21B 47/16 367/82 |
| 2010/0224356 | A1 | 9/2010 | Moore |
| 2010/0224411 | A1 | 9/2010 | Burrows et al. |
| 2011/0001633 | A1 | 1/2011 | Lam et al. |
| 2012/0217023 | A1 | 8/2012 | Chau et al. |
| 2012/0218863 | A1 | 8/2012 | Chau et al. |
| 2014/0055278 | A1 | 2/2014 | Chau et al. |

OTHER PUBLICATIONS

The International Search Report and The Written Opinion of the International Searching Authority for International Application No. PCT/US2013/020359 which is associated with U.S. Appl. No. 13/733,097, Apr. 18, 2013, Moscow, Russia.
The International Preliminary Report on Patentability for International Application No. PCT/US2013/020359 which is associated with U.S. Appl. No. 13/733,097, Jul. 8, 2014, Geneva, Switzerland.
Official Action of Substantive Examination for International Application No. PCT/US2014/126338 which is associated with U.S. Appl. No. 15/006,504 (Parent of subject application), Federal Institute of Industrial Property, Jun. 24, 2015, Moscow, Russia.
Extended European Search Report for European Application No. 13733871.1 which is associated with International Application No. PCT/US2013/020359 which is associated with U.S. Appl. No. 13/733,097, May 18, 2016, Munich, Germany.
The First Office Action of The State Intellectual Property Office of People's Republic of China for Chinese Application No. 201310001524.8 which is associated with International Application No. PCT/US2013/020359 which is associated with U.S. Appl. No. 13/733,097, Sep. 24, 2015. (machine translation included).
The Second Office Action of The State Intellectual Property Office of People's Republic of China for Chinese Application No. 201310001524.8 which is associated with International Application No. PCT/US2013/020359 which is associated with U.S. Appl. No. 13/733,097, Jun. 29, 2016. (machine translation included).
The Third Office Action of The State Intellectual Property Office of People's Republic of China for Chinese Application No. 201310001524.8 which is associated with International Application No. PCT/US2013/020359 which is associated with U.S. Appl. No. 13/733,097, Dec. 30, 2016.
Communication Pursuant to Article 94(3) EPC for Application No. 131733871.1 which is associated with International Application No. PCT/US2013/020359 which is associated with U.S. Appl. No. 13/733,097, Feb. 24, 2017, European Patent Office, Netherlands.
The Fourth Office Action of The State Intellectual Property Office of People's Republic of China for Chinese Application No. 201310001524.8 which is associated with International Application No. PCT/US2013/020359 which is associated with U.S. Appl. No. 13/733,097, Jul. 12, 2017. (machine translation included).
Communication Pursuant to Article 94(3) EPC for Application No. 13733871.1 which is associated with International Application No. PCT/US2013/020359 which is associated with U.S. Appl. No. 13/733,097, Jan. 26, 2018, European Patent Office, Netherlands.
Prosecution History of U.S. Appl. No. 15/581,135 as of Feb. 6, 2020.

* cited by examiner

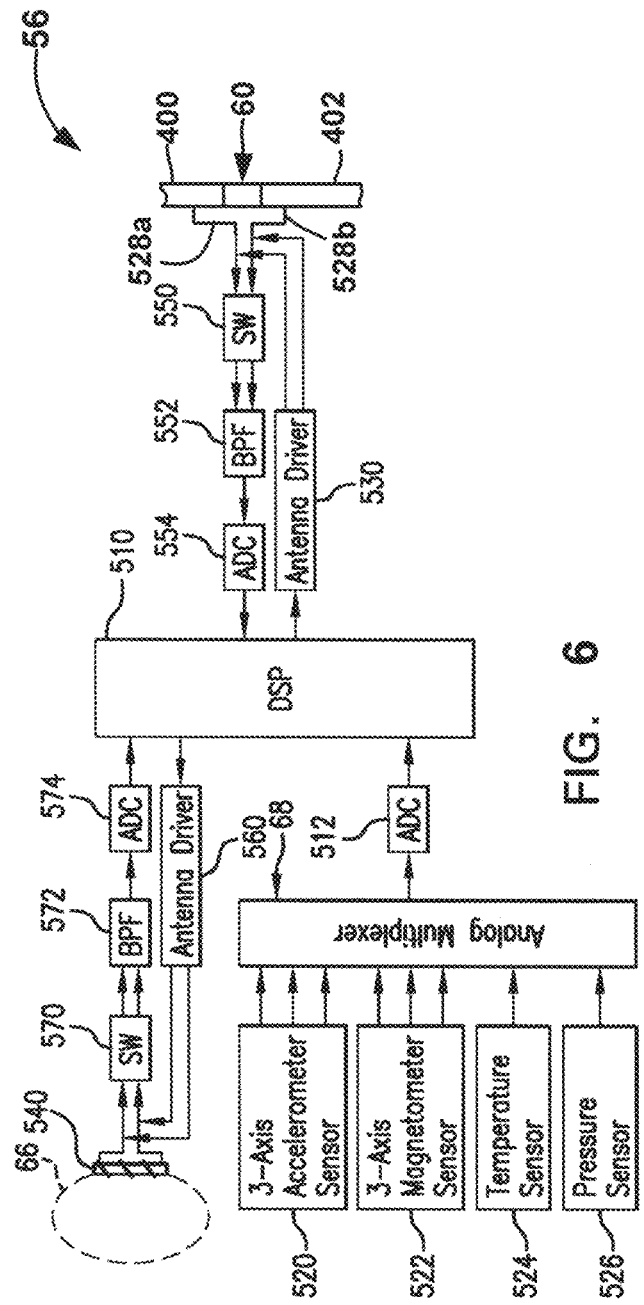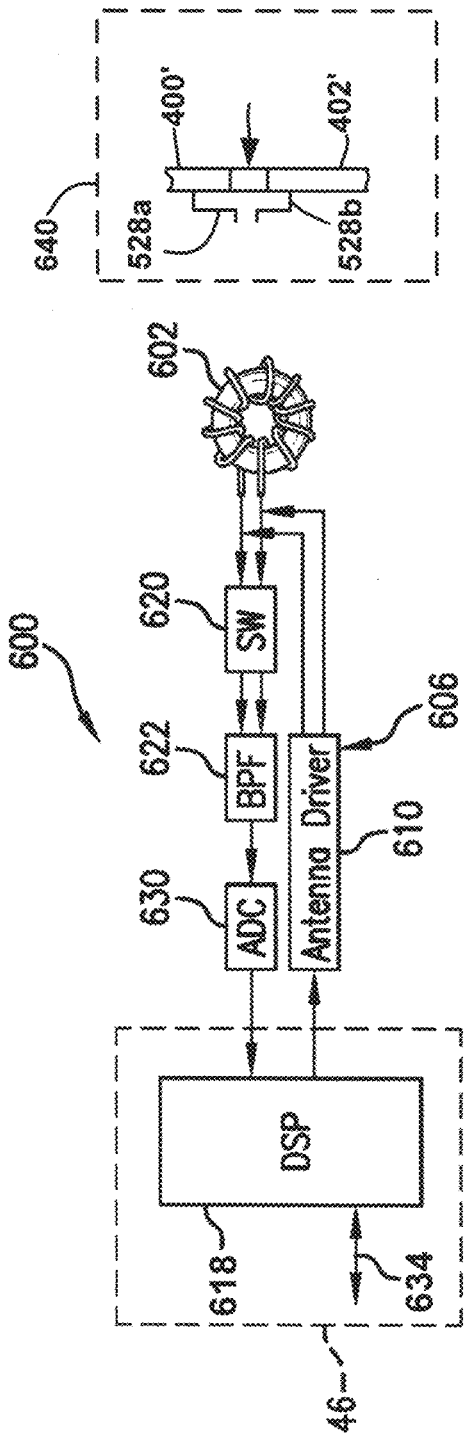
FIG. 6
FIG. 7

ADVANCED DRILL STRING COMMUNICATION SYSTEM, COMPONENTS AND METHODS

RELATED APPLICATIONS

The present application is a continuation application of U.S. patent application Ser. No. 17/571,536 filed on Jan. 10, 2022, which is a divisional application of U.S. patent application Ser. No. 16/714,792 filed on Dec. 16, 2019 and issued as U.S. Pat. No. 11,255,185 on Feb. 22, 2022, which is a divisional application of U.S. patent application Ser. No. 15/006,504 filed on Jan. 26, 2016, now issued as U.S. Pat. No. 10,513,919 on Dec. 24, 2019, which is a divisional application of U.S. patent application Ser. No. 13/733,097 filed on Jan. 2, 2013, now issued as U.S. Pat. No. 9,274,243 on Mar. 1, 2016, which claims priority from U.S. Provisional Patent Application Ser. No. 61/583,591, filed on Jan. 5, 2012, the disclosures of which are incorporated herein by reference.

BACKGROUND

The present application is generally related to inground operations and, more particularly, to a system, apparatus and method involving an advanced drill string communication system that couples an electrical signal onto the electrically conductive drill string for data transmission while providing compensation at least for noise and distortion effects. Walk-over locator communications can be integrally supported by the system and associated methods.

Generally, an inground operation such as, for example, drilling to form a borehole, subsequent reaming of a borehole for purposes of installing a utility line, borehole mapping and the like use an electrically conductive drill string which extends from an above ground drill rig. The prior art includes examples of the use of an electrically conductive drill string as an electrical conductor for serving to electrically conduct a data signal from an inground tool to the drill rig. The surrounding earth itself serves as a signal return path for purposes of detecting the signal at the drill rig. This type of system is often referred to as a measurement while drilling, MWD, system. Applicants recognize, however, that that there remains a need for improvement in MWD systems.

The foregoing examples of the related art and limitations related therewith are intended to be illustrative and not exclusive. Other limitations of the related art will become apparent to those of skill in the art upon a reading of the specification and a study of the drawings.

BRIEF DESCRIPTIONS OF THE DRAWINGS

Exemplary embodiments are illustrated in referenced figures of the drawings. It is intended that the embodiments and figures disclosed herein are to be illustrative rather than limiting.

FIG. 6 is a block diagram which illustrates one embodiment of an electronics section that can be used with the coupling adapter of the present disclosure.

FIG. 7 is a block diagram which illustrates one embodiment of an electronics section that can be used at the drill rig or as part of a drill string repeater in cooperation with the coupling adapter of the present disclosure serving an inground tool.

SUMMARY

Figure 1:
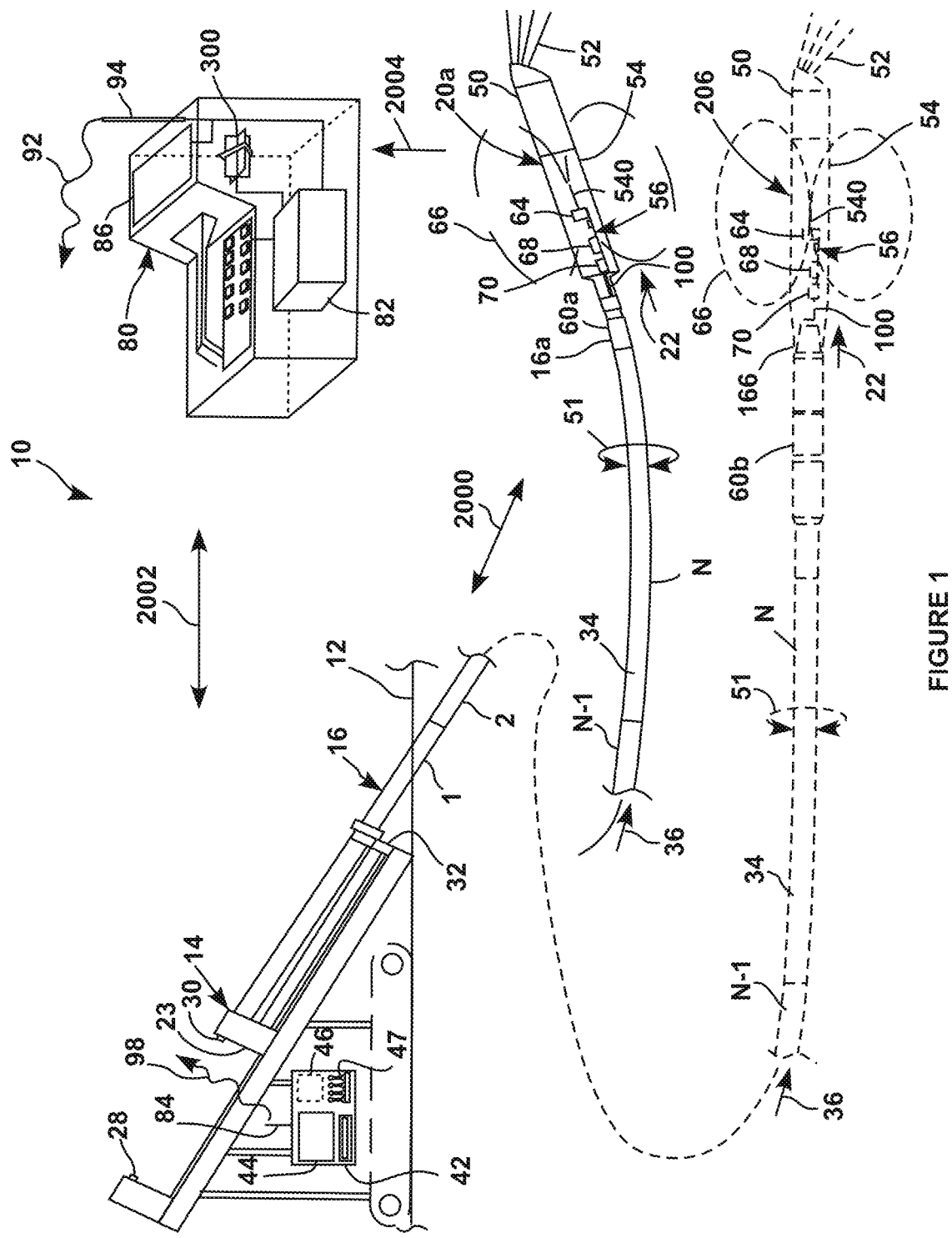
FIG. 1 is a diagrammatic view, in elevation, of a system which utilizes the advanced drill string coupling system of the present disclosure.

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect of the disclosure, a drill string communication system, associated apparatus and method are disclosed. The drill string communication system utilizes a drill string, extending from a drill rig to an inground tool, as an electrical conductor to provide communication between the drill rig and the inground tool. An uphole transceiver is located at the drill rig and includes an uphole transmitter that couples an uphole signal onto the drill string at an uphole transmit power for transmission to the inground tool. A downhole transceiver is located downhole proximate to the inground tool including a downhole transmitter that couples a downhole signal onto the drill string at a downhole transmit power that is selectable within a downhole power transmit range for transmission to the drill rig on the drill string and the uphole transmit power is always greater than any selected downhole transmit power within the downhole power transmit range.

In another aspect of the disclosure, a method and associated apparatus are described for operating a drill string communication system which utilizes a drill string extending from a drill rig to an inground tool as an electrical conductor to provide communication between the drill rig and the inground tool. Responsive to a loss of reception of a downhole signal transmitted on the drill string from the inground tool using a current set of transmission parameters, communication from the drill rig to the inground tool is re-initiated using an uphole transceiver at a maximum uphole transmit power of the uphole transceiver to couple an uphole re-initialization signal to the inground tool. Based on a response from the inground tool to the uphole re-initialization signal, a procedure is entered to establish a new set of transmission parameters for at least one of the downhole signal and the uphole signal to thereafter establish communication between the drill rig and the inground tool.

In still another aspect of the disclosure, a drill string communication system and associated method are described which utilize a drill string extending from a drill rig to an inground tool as an electrical conductor to provide communication between the drill rig and the inground tool. An uphole transceiver is located at the drill rig including an uphole transmitter that couples an uphole signal onto the drill string at an uphole transmit power for transmission to the inground tool. A downhole transceiver is located downhole proximate to the inground tool including a downhole transmitter that couples a downhole signal onto the drill string at a downhole transmit power that is selectable within a downhole power transmit range for transmission to the drill rig on the drill string and to emanate an electromagnetic locating signal having at least one selectable operational parameter. A walkover locator receives the electromagnetic locating signal and detects a predetermined degradation of the received locating signal and, responsive to detecting the predetermined degradation, the system is configured to automatically generate a reconfiguration command that changes at least one of a carrier frequency, a transmit power, a baud rate and a modulation mode of the electromagnetic locating signal.

In yet another aspect of the disclosure, a drill string communication system and associated method are described which utilize a drill string extending from a drill rig to an inground tool as an electrical conductor to provide communication between the drill rig and the inground tool. An uphole transceiver is located at the drill rig and includes an uphole transmitter that couples an uphole signal onto the drill string at an uphole transmit power for transmission to the inground tool. A downhole transceiver is located downhole proximate to the inground tool including a downhole transmitter that couples a downhole signal onto the drill string at a downhole transmit power that is selectable within a downhole power transmit range for transmission to the drill rig on the drill string and to emanate an electromagnetic locating signal having at least one selectable operational parameter. A portable walkover locator receives the electromagnetic locating signal and detects a loss of reception of the electromagnetic locating signal and, responsive to the loss of reception, automatically indicates a loss of signal condition to the drill rig.

In a further aspect of the disclosure, a drill string communication system and associated method utilize a drill string extending from a drill rig to an inground tool as an electrical conductor to provide communication between the drill rig and the inground tool. An uphole transceiver is located at the drill rig including an uphole transmitter that couples an uphole signal onto the drill string for transmission to the inground tool. A downhole transceiver is located downhole proximate to the inground tool including a downhole transmitter that couples a downhole signal onto the drill string for transmission to an uphole receiver which forms part of the uphole transceiver. The uphole transceiver and the downhole transceiver are configured to cooperate for automatic modification of at least one operational transmission parameter of the downhole signal based at least in part on a signal degradation of the downhole signal as detected by the uphole transceiver.

In a continuing aspect of the disclosure, an apparatus and associated method are described for use in a drill string communication system which utilizes a drill string, extending from a drill rig to an inground tool, as an electrical conductor to provide communication between the drill rig and the inground tool. The drill string exhibits a channel transfer function when acting as such an electrical conductor carrying a downhole signal that is coupled to the drill string by the inground tool. An uphole receiver receives the downhole signal from the drill string as a transferred signal that is influenced by the channel transfer function and the uphole receiver is configured to apply a compensation response to the transferred signal which compensated response is customized based on the channel transfer function.

In another aspect of the disclosure, a walkover locator and associated method are described for use in a system which utilizes a drill string extending from a drill rig to an inground tool with the inground tool configured to transmit an electromagnetic locating signal. A receiver is configured to receive the locating signal and to detect a degradation of reception of the locating signal and to generate a signal loss command responsive to detection of the degradation. A telemetry transmitter is configured to transmit the signal loss command to the drill rig.

In another aspect of the disclosure, a system and associated method are described for performing an inground operation at least which utilizes a drill string extending from a drill rig to an inground tool as an electrical conductor to provide communication between the drill rig and the inground tool. A downhole transceiver is located downhole proximate to the inground tool which is configured (i) to receive at least one sensor signal relating to an operational parameter of the inground tool, (ii) to generate a downhole signal that is transmitted to the drill rig on the drill string and which downhole signal is modulated based on the sensor signal, and (iii) to emanate an electromagnetic locating signal for above ground detection which locating signal is unmodulated at least by the sensor signal. An uphole transceiver is located at the drill rig including an uphole receiver that is configured to receive the downhole signal from the drill string and to recover the sensor signal such that information relating to the operational parameter is available at the drill rig. A walkover locator receives the electromagnetic locating signal to serve as at least one of a homing beacon and a tracking signal such that a detection range of the locating signal for a given transmission power without modulation is greater than the detection range of a modulated locating signal modulated by the sensor signal at the same, given transmission power.

In another aspect of the disclosure, a system and method are described for performing an inground operation at least which utilizes a drill string extending from a drill rig to an inground tool as an electrical conductor to provide communication between the drill rig and the inground tool. An uphole transceiver is located at the drill rig including an uphole transmitter that is configured at least to transmit an uphole signal on the drill string to the inground tool. A downhole transceiver is located downhole proximate to the inground tool and is configured to receive the uphole signal from the drill string and to selectively emanate an electromagnetic locating signal for above ground detection. A walkover locator receives the electromagnetic locating signal and automatically detects an active/inactive status of the walkover locator and, responsive to detecting a change in the active/inactive status, the walkover locator is configured to transmit a status indication to the drill rig that is indicative of a new active/inactive status. The uphole transceiver and the downhole transceiver are further configured to cooperate at least to turn off the electromagnetic locating signal responsive to the inactive state.

In another aspect of the disclosure, a communication system and associated method are described for use in a system for performing an inground operation at least which utilizes a drill string extending from a drill rig to an inground tool and a walkover detector to serve as at least one of a homing beacon and a tracking device. An uphole transceiver is located at the drill rig. A downhole transceiver is located downhole proximate to the inground tool. A telemetry transceiver forms part of the walkover locator. A first bidirectional communication link between the uphole transceiver and the downhole transceiver uses the drill string as an electrical conductor to provide communication between the uphole transceiver and the downhole transceiver. A second bidirectional communication link between the uphole transceiver and the telemetry transceiver of the walkover locator employs wireless electromagnetic communication between the uphole transceiver and the telemetry transceiver. At least a unidirectional communication link is formed from the downhole transceiver of the inground tool to the walkover locator such that (i) a first communication mode is provided from the downhole transceiver to the uphole transceiver at the drill rig via the drill string using the first bidirectional communication link, (ii) a second communication mode is provided from the downhole transceiver to the uphole transceiver via the unidirectional communication link, the telemetry transceiver at the walkover locator and the second bidirectional communication link, and (iii) a controller manages communication between the downhole transceiver and the uphole transceiver based at least in part on system status.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology may be used with respect to these descriptions, however, this terminology has been adopted with the intent of facilitating the reader's understanding and is not intended as being limiting. Further, the figures are not to scale for purposes of illustrative clarity.

Turning now to the figures wherein like components are indicated by like reference numbers throughout the various figures, attention is immediately directed to FIG. 1 which is an elevational view that diagrammatically illustrates one embodiment of a horizontal directional drilling system generally indicated by the reference number 10 and produced in accordance with the present disclosure. While the illustrated system shows the invention within the framework of a horizontal directional drilling system and its components for performing an inground boring operation, the invention enjoys equal applicability with respect to other operational procedures including, but not limited to vertical drilling operations, pullback operations for installing utilities, mapping operations and the like.

FIG. 1 illustrates system 10 operating in a region 12. System 10 includes a drill rig 14 having a drill string 16 extending therefrom to a boring tool 20a or 20b. It is noted that two instances of the inground end of the drill string 12a and 12b as well as boring tool 20a and 20b are shown for reasons that will become apparent. Instance 16a of the drill string and 20a of the boring tool are shown using solid lines while instance 16b of the drill string and 20b of the boring tool are shown in phantom using dashed lines. It should be appreciated that only a selected one of the two illustrated instances is used during a given inground operation. General references to the drill string and the boring tool may use the reference numbers 16 and 20. The drill string can be pushed into the ground to move inground tool 20 at least generally in a forward direction 22 indicated by arrows. While the present example is framed in terms of the use of a boring tool, it should be appreciated that the discussions apply to any suitable form of inground tool including but not limited to a reaming tool, a tension monitoring tool for use during a pullback operation in which a utility or casing can be installed, a mapping tool for use in mapping the path of the borehole, for example, using an inertial guidance unit and downhole pressure monitoring. In the operation of a boring tool, it is generally desirable to monitor based on the advance of the drill string whereas in other operations such as a pullback operation, monitoring is generally performed responsive to retraction of the drill string.

With continuing reference to FIG. 1, drill string 16 is partially shown and is segmented, being made up of a plurality of removably attachable, individual drill pipe sections some of which are indicated as 1, 2, N−1 and N, having a section or segment length and a wall thickness. The drill pipe sections may be referred to interchangeably as drill rods having a rod length. During operation of the drill rig, one drill pipe section at a time can be added to the drill string and pushed into the ground by the drill rig using a movable carriage 24 in order to advance the inground tool. Drill rig 14 can include a suitable monitoring arrangement for measuring movement of the drill string into the ground such as is described, for example, in U.S. Pat. No. 6,035,951 (hereinafter the '951 patent), entitled SYSTEMS, ARRANGEMENTS AND ASSOCIATED METHODS FOR TRACKING AND/OR GUIDING AN UNDERGROUND BORING TOOL, which is commonly owned with the present application and hereby incorporated by reference. For example, a stationary ultrasonic receiver 28 can be positioned on a drill frame of the drill rig while an ultrasonic transmitter 30 can be positioned on a movable carriage which is used to extend and retract the drill string. The distance between receiver 28 and transmitter 30 can be established within a fraction of an inch. By monitoring this distance in conjunction with monitoring the status of a clamping arrangement 32, which is actuated responsive to removing or adding a drill rod to the drill string, the length of the drill string can be tracked.

Each drill pipe section defines a through opening 34 (two of which are indicated) extending between opposing ends of the pipe section. The drill pipe sections can be fitted with what are commonly referred to as box and pin fittings such that each end of a given drill pipe section can threadingly engage an adjacent end of another drill pipe section in the drill string in a well known manner. Once the drill pipe sections are engaged to make up the drill string, the through openings of adjacent ones of the drill pipe sections align to form an overall pathway 36 that is indicated by arrows. Pathway 36, of each downhole instance of the drill string, can provide for a pressurized flow of drilling fluid or mud, consistent with the directions of arrows 36, from the drill rig to the drill head, as will be further described.

The location of the boring tool within region 12 as well as the underground path followed by the boring tool may be established and displayed at drill rig 14, for example, on a console 42 using a display 44. The console can include a processing arrangement 46 and a control actuator arrangement 47. It is noted that processing arrangement 46 at the drill rig can include what may be referred to below as an uphole transceiver.

Boring tool 20 can include a drill head 50 having an angled face for use in steering based on roll orientation. That is, the drill head when pushed ahead without rotation will generally be deflected on the basis of the roll orientation of its angled face. On the other hand, the drill head can generally be caused to travel in a straight line by rotating the drill string as it is pushed as indicated by a double headed arrow 51. Of course, predictable steering is premised upon suitable soil conditions. It is noted that the aforementioned drilling fluid can be emitted as jets 52 under high pressure for purposes of cutting through the ground immediately in front of the drill head as well as providing for cooling and lubrication of the drill head. Boring tool 20 includes an inground housing 54 that receives an electronics package 56. For purposes of the descriptions that follow, this electronics package may be referred to as a downhole transceiver. The inground housing is configured to provide for the flow of drilling fluid to drill head 50 around the electronics package. For example, the electronics package can be cylindrical in configuration and supported in a centered manner within housing 54. Drill head 50 can include a box fitting that receives a pin fitting of inground housing 54. An opposing end of the inground housing can include a box fitting that receives a pin fitting of a coupling adapter 60a or 60b. It is noted that the two instances of the coupling adapter that are shown by way of non-limiting example may be referred to generally by the reference number 60 with the understanding that any suitable embodiment can be utilized. An opposing end of coupling adapter 60 can include a box fitting that receives a pin fitting which defines a distal, inground end of the drill string. It is noted that the box and pin fittings of the drill head, the inground housing and the coupling adapter are generally the same box and pin fittings as those found on the drill pipe sections of the drill string for facilitating removable attachment of the drill pipe sections to one another in forming the drill string. Inground electronics package 56 can include a transceiver 64 which, in some embodiments, can transmit a locating signal 66 such as, for example, a dipole locating signal, although this is not required. In some embodiments, transceiver 64 can receive an electromagnetic signal that is generated by other inground components as will be described at an appropriate point below. The present example will assume that the electromagnetic signal is a locating signal in the form of a dipole signal for descriptive purposes. Accordingly, the electromagnetic signal may be referred to as a locating signal. It should be appreciated that the dipole signal can be modulated like any other electromagnetic signal and that the modulation data is thereafter recoverable from the signal. The locating functionality of the signal depends, at least in part, on the characteristic shape of the flux field and its signal strength rather than its ability to carry modulation. Thus, modulation is not required. Information regarding certain parameters of the boring tool such as, for example, pitch and roll (orientation parameters), temperature and drilling fluid pressure can be measured by a suitable sensor arrangement 68 located within the boring tool which may include, for example, a pitch sensor, a roll sensor, a temperature sensor, an AC field sensor for sensing proximity of 50/60 Hz utility lines and any other sensors that are desired such as, for example, a DC magnetic field sensor for sensing yaw orientation (a tri-axial magnetometer, with a three axis accelerometer to form a electronic compass to measure yaw orientation). Electronics package 56 further includes a processor 70 that is interfaced as necessary with sensor arrangement 68 and transceiver 64. Another sensor that can form part of the sensor arrangement is an accelerometer that is configured for detecting accelerations on one or more axes. A battery (not shown) can be provided within the housing for providing electrical power.

A walkover/portable locator 80 can be used to detect electromagnetic signal 66. One suitable and highly advanced portable locator is described in U.S. Pat. No. 6,496,008, entitled FLUX PLANE LOCATING IN AN UNDERGROUND DRILLING SYSTEM, which is commonly owned with the present application and is incorporated herein by reference in its entirety. As mentioned above, the present descriptions apply to a variety of inground operations and are not intended as being limiting, although the framework of horizontal directional drilling has been employed for descriptive purposes. As discussed above, the electromagnetic signal can carry information including orientation parameters such as, for example, pitch and roll. Other information can also be carried by the electromagnetic signal. Such information can include, by way of example, parameters that can be measured proximate to or internal to the boring tool including temperatures and voltages such as a battery or power supply voltage. Locator 80 includes an electronics package 82. It is noted that the electronics package is interfaced for electrical communication with the various components of the locator and can perform data processing. Information of interest can be modulated on electromagnetic signal 66 in any suitable manner and transmitted to locator 80 and/or an antenna 84 at the drill rig, although this is not required. Any suitable form of modulation may be used either currently available or yet to be developed. Examples of currently available and suitable types of modulation include amplitude modulation, frequency modulation, phase modulation and variants thereof. Any parameter of interest in relation to drilling such as, for example, pitch may be displayed on display 44 and/or on a display 86 of locator 80 as recovered from the locating signal. Drill rig 14 can transmit a telemetry signal 98 that can be received by locator 80. A telemetry signal 92 can be transmitted from locator 80 to the drill rig via a telemetry antenna 94. The telemetry components provide for bidirectional signaling between the drill rig and locator 80. As one example of such signaling, based on the status of clamping arrangement 32, the drill rig can transmit an indication that the drill string is in a stationary state because a drill pipe section is being added to or removed from the drill string during which time the clamping arrangement engages the drill string.

Still referring to FIG. 1, an electrical cable 100 can extend from inground electronics package 56 such that any sensed value or parameter relating to the operation of the inground tool can be electrically transmitted on this cable. One of ordinary skill in the art will appreciate that what is commonly referred to as a "wire-in-pipe" can be used to transfer signals to the drill rig. The term wire-in-pipe refers to an electrical cable that is housed within interior passageway 34 that is formed by the drill string. In accordance with the present disclosure, however, cable 100 extends to an embodiment of inground coupling adapter 60 or other suitable inground arrangement. As noted above, a first embodiment is designated by the reference number 60a coupled to boring tool 50a and a second embodiment is designated by the reference number 60b coupled to boring tool 50b, as will be further described immediately hereinafter.

Figure 2:
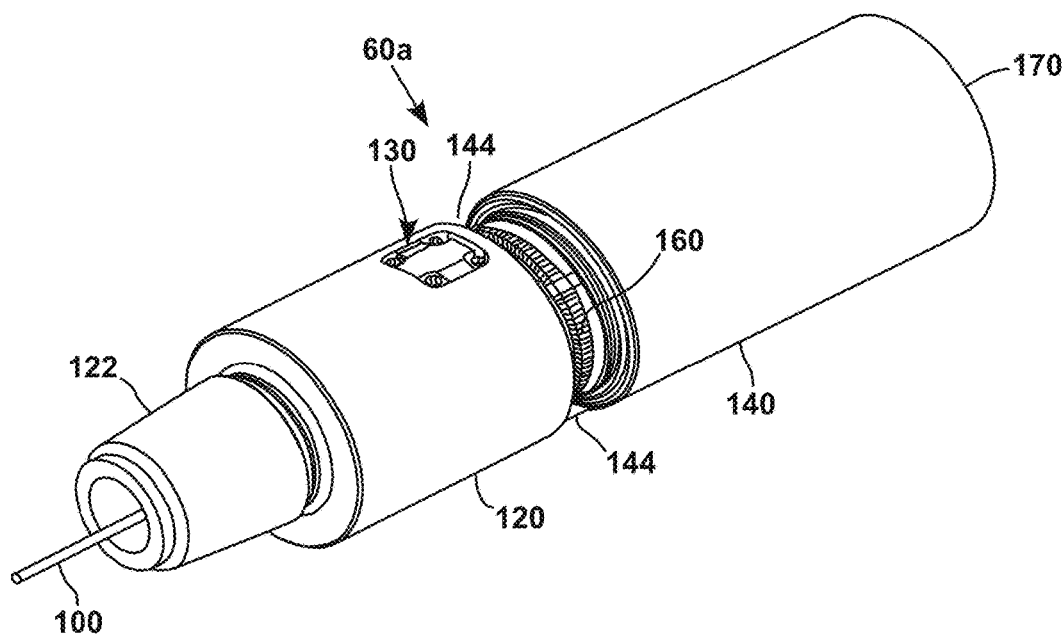
FIG. 2 is a diagrammatic perspective view of one embodiment of a coupling adapter that utilizes a current transformer for purposes of coupling a signal to and from the electrically conductive drill string.

Attention is now directed to FIG. 2 in conjunction with FIG. 1. FIG. 2 is a diagrammatic perspective view which illustrates embodiment 60a of the coupling adapter in further detail. It is noted that coupling adapter 60a, as described, is representative of one embodiment of a suitable coupling arrangement and is described in detail in copending U.S. patent application Ser. No. 13/035,774, entitled DRILL STRING COUPLING ADAPTER AND METHOD FOR INGROUND SIGNAL COUPLING, which is hereby incorporated by reference in its entirety. In particular, coupling adapter 60a includes a main body 120 which forms a pin fitting 122 for engaging a box fitting (not shown) of inground housing 54. It is noted that threads have not been shown on the pin fitting for purposes of illustrative clarity, but are understood to be present. The main body includes at least one high pressure electrical connection assembly. Coupling adapter 60a further includes an extension body 140 that is removably attachable to main body 120 such that either the main body or extension body can be replaced. The main body and extension body can be formed from any suitable material such as, for example, from nonmagnetic alloys including nonmagnetic stainless steels and from magnetic alloys such as, for example, 4140, 4142, 4340 or any suitable high strength steel. Particularly when the coupling adapter is to be placed many feet or many drill rods from the electronics module which drives it, a non-magnetic version may not be needed. However, if the coupling adapter is to be used near an inground device such as, for example, a steering tool which detects the magnetic field of the Earth, the use of a nonmagnetic material avoids potential field disturbance. It is well known, in this regard, that nonmagnetic, high strength alloys as opposed to their magnetic counterparts are typically much higher in cost. It is noted that there is no requirement that the main body and extension body are formed from the same material.

A cylindrical ring 144 is received between main body 120 and extension body 140. It is noted that the cylindrical ring has been rendered as transparent for purposes of the present description such that a current transformer 160 is visible. The cylindrical ring can be formed from any suitable material which is generally resistant to the inground environment and which is electrically insulative. By way of non-limiting example, one suitable material is transformation toughened zirconium oxide ceramic, other ceramic materials may also be suitable. As seen in FIG. 2, an outer surface of cylindrical ring 144 can be inset with respect to outer surfaces of both the main body and extension body for purposes of reducing the potential of damage to the cylindrical ring as well as reducing wear on the cylindrical ring. For example, clamping arrangement 32 (FIG. 1) can bridge across and remain out of contact with the cylindrical ring based on the inset. Further, inground wear of the cylindrical ring can be reduced due to rotation, advancement and retraction of the drill string. In this regard, it should be appreciated that electrical connection assembly 130 can be inset for similar reasons as can be seen in FIG. 2. The current transformer can include a coil that is wound upon an annular or toroidal core. In this regard, the core can include any suitable cross-sectional shape such as, for example, rectangular, square and circular. In the embodiment which is illustrated, the core can be split in order to facilitate installation of the current transformer. A pair of electrical leads from the opposing ends of the current transformer coil can be connected to cable 100 at electrical connection assembly 130. It should be appreciated that any suitable current transformer can be used and that the particular current transformer that is described here is not intended as limiting. An opposing end 170 of extension body 140 defines a box fitting for threadingly engaging the inground, distal end of the drill string. With regard to FIG. 1, it should be appreciated that coupling adapter 60 can be installed between any two adjacent ones of the drill pipe sections as the drill string is assembled at the drill rig. For example, a suitable embodiment of the coupling adapter can be located between drill pipe sections N−1 and N in FIG. 1. Cable 100 then extends from the inground tool through drill pipe section n to reach the coupling adapter.

Figure 3:
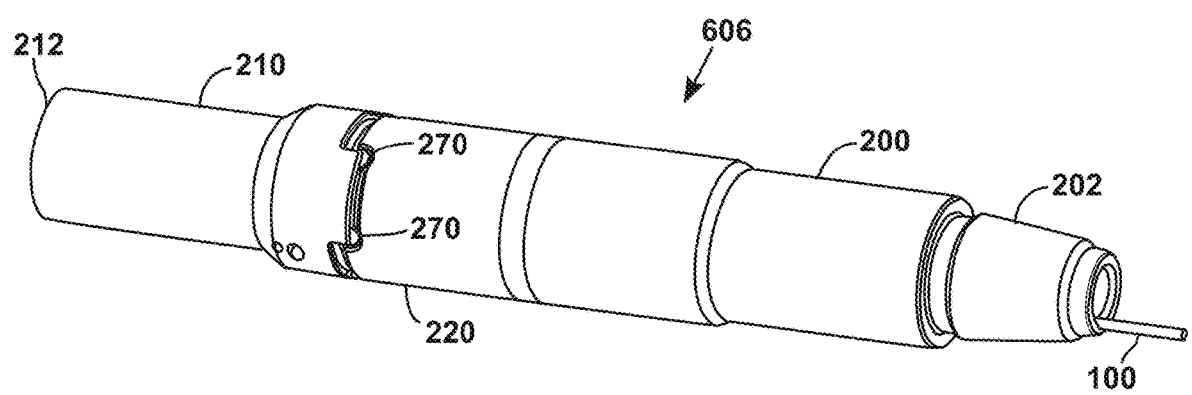
FIG. 3 is a diagrammatic view of another embodiment of a coupling adapter that forms an electrically isolating gap for purposes of coupling a signal to and from the electrically conductive drill string.

Attention is now directed to FIG. 3 which is a diagrammatic perspective view that illustrates an embodiment of coupling adapter 60b. It is noted that FIG. 3 corresponds to FIG. 2 of U.S. patent application Ser. No. 13/593,439 (hereinafter, the '439 Application), entitled DRILL STRING INGROUND ISOLATOR IN AN MWD SYSTEM AND ASSOCIATED METHOD, which is hereby incorporated by reference in its entirety. The embodiment of FIG. 3 is representative of one a number of suitable embodiments that are disclosed in the '439 Application. Each of these embodiments, when positioned in a drill string as shown in FIG. 1, forms an electrically isolating gap or break in the drill string. The '439 Application also discloses an inground interchangeable tool system that forms an electrically isolating gap as yet another useful embodiment in the context of the present application.

The assembly includes a pin end housing 200 having a pin fitting 202 defining a through passage from which cable 100 can extend for external electrical connection. A box end housing 210 defines a box fitting 212. Pin fitting 202 and box fitting 212 can match the fittings on drill pipe sections that make up drill string 16 such that the isolator can be inserted in any desired joint in the drill string. The isolator further includes a drive dog housing 220 that engages each of pin housing end 200 and box housing end 210 with the drive dog housing electrically coupled to the pin housing in the overall assembly. The pin housing end, box housing end and drive dog housing in the present embodiment are generally formed from suitable high strength materials such as, for example, 4340, 4140, 4142 as well as 15-15HS or Monel K500 (wherein the latter two are non-magnetic high strength alloys), since these components are subjected to the potentially hostile downhole environment as well as relatively extreme force. Based on the disposition of a plurality of electrically isolating members 270 which can be of any suitable shape, box end housing 210 is electrically isolated from pin end housing 200 to define an electrically isolating/insulative gap.

It should be appreciated that any suitable arrangement can be used for purposes of coupling a signal onto the drill string and the details with respect to the specific structure of illustrated embodiments for purposes of accomplishing signal coupling to the drill string are not intended as limiting. For example, another suitable arrangement that utilizes a current transformer is described in U.S. patent application Ser. No. 13/035,833, entitled INGROUND DRILL STRING HOUSING AND METHOD FOR SIGNAL COUPLING, which is incorporated by reference in its entirety. In this latter application, the current transformer is supported by an inground housing that can also support an electronics package. Moreover, the prior art includes examples of other arrangements that at least assertedly provide an electrically isolating gap. By way of example, U.S. Pat. No. 7,649,474, at col. 3, lns. 33-42 describes the simple approach of using materials such as a fiberglass section configured with metal ends to form an electrically isolating section in the drill string.

Figure 4:
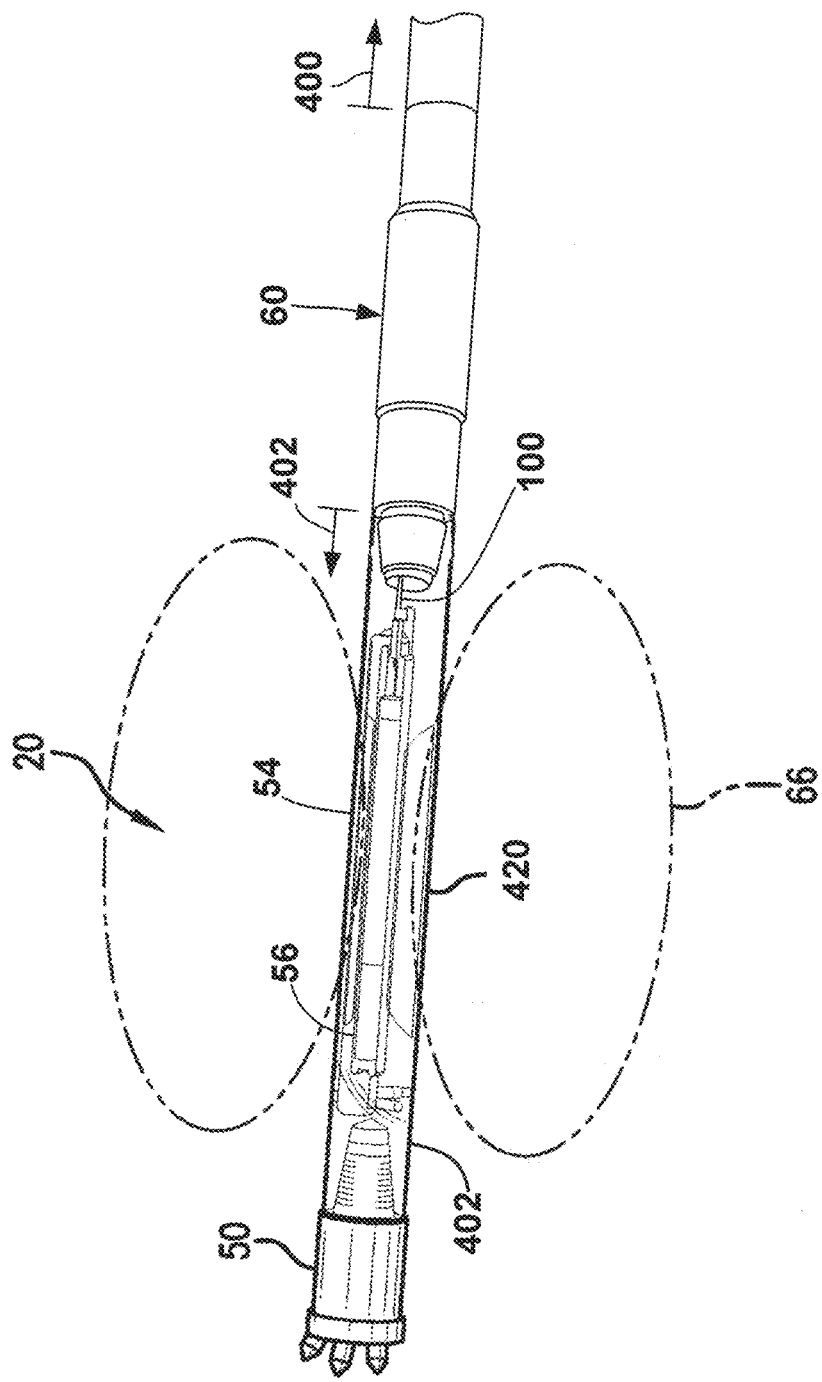
FIG. 4 is a diagrammatic view, in perspective, of one embodiment of an inground tool in the form of a drill head and inground housing connected to an embodiment of the coupling adapter of the present disclosure.

FIG. 4 is a diagrammatic view, in perspective, which illustrates inground tool 20 in the form of a boring tool having drill head 50. For purposes of this disclosure, a coupling adapter/isolator 60 or other suitable arrangement is installed as part of a drill string having an uphole portion 400 and a downhole portion 402. The downhole portion of the drill string can comprise any suitable inground housing 54 such as a drill head housing and/or one or more intervening drill pipe sections (not shown) that connect isolator 60 to the inground housing. In the present example, the inground housing is a drill head or boring tool. Cable 100 can extend within the through passage of the drill string to electronics package 56 for electrical communication with drill string transceiver 64 (FIG. 1). Depending upon the particular embodiment, conductors of cable 100 can be connected, for example, to a current transformer or in a way that bridges an electrically isolating gap. As discussed above, drilling fluid can flow around the electronics package to reach an inground distal end of the drill string such as a drill head. In the illustrated embodiment, inground housing 54 includes slots 420 for purposes of emitting signal 66 from transceiver 64 (FIG. 1). Coupling adapter 60 is removably attached to inground housing 54 which is itself ready for removable attachment to a distal end of the drill string.

Figure 5:
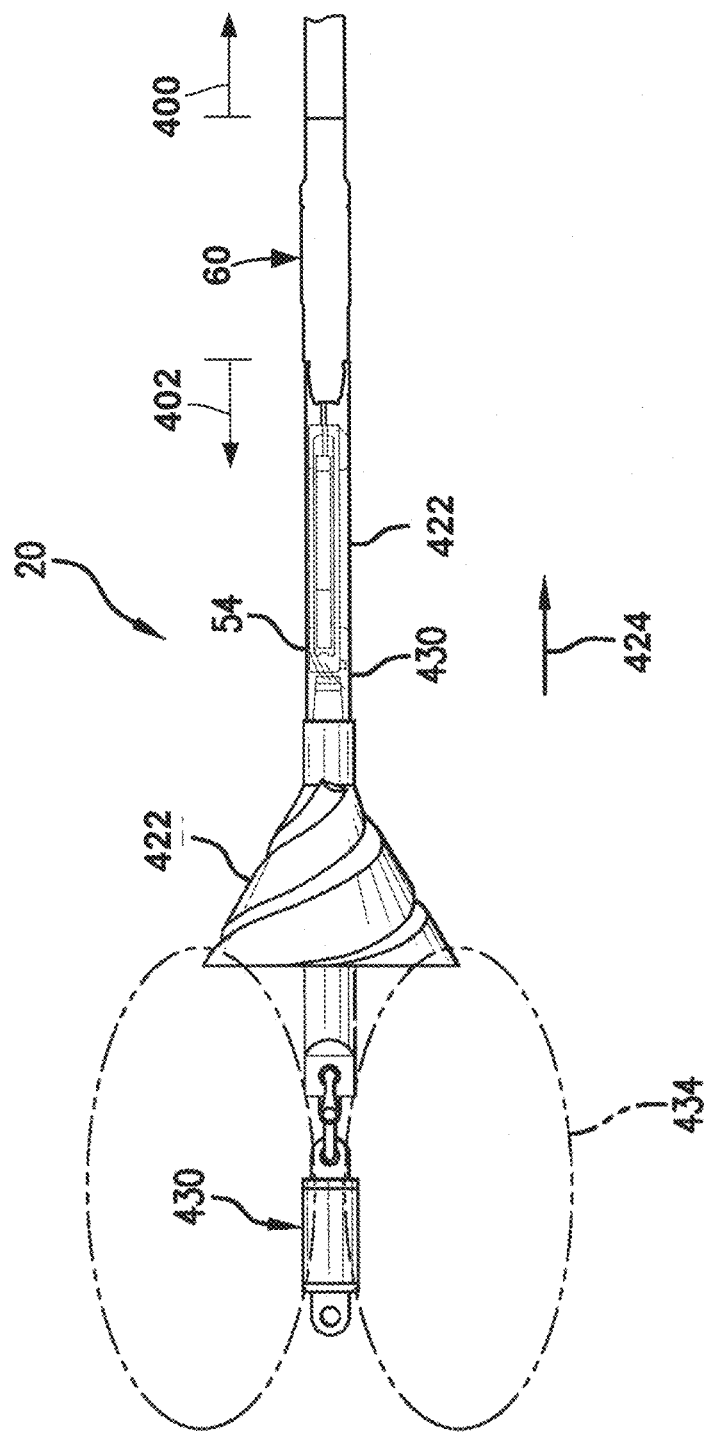
FIG. 5 is a diagrammatic view, in perspective, of another embodiment of an inground tool in the form of a tension monitor and reaming tool connected to an embodiment of the coupling adapter of the present disclosure.

FIG. 5 is a diagrammatic view, in perspective, which illustrates inground tool 20 in the form of a reaming tool including a reamer 422 that is removably attached to one end of inground housing 54. Housing 54 and coupling adapter 60 are otherwise provided in this embodiment in the same manner as in FIG. 4. The reaming tool is pulled in a direction 424, which is indicated by an arrow, for purposes of enlarging a borehole as the reaming tool is pulled toward the drill rig by the drill string. An opposing end of the reaming tool is attached to one end of a tension monitoring arrangement 430. An opposing end of the tension monitoring arrangement can be attached to a utility (not shown) that is to be pulled through the enlarged borehole for installation of the utility in the borehole. Tension monitoring arrangement 430 measures the pull forces that are applied to the utility during the reaming operation. One suitable and highly advantageous tension monitoring arrangement is described in U.S. Pat. No. 5,961,252 which is commonly owned with the present application and incorporated herein by reference in its entirety. Tension monitoring arrangement 430 can transmit an electromagnetic signal 434 upon which tension monitoring data can be modulated. Signal 434 can be received by transceiver 64 (FIG. 1) such that corresponding data can be placed upon the drill string using current transformer 160 (see FIG. 2) for transmission to the drill rig. It should be appreciated that a wireless signal can be received from any form of inground tool by transceiver 64 and that the present embodiment, which describes a tension monitoring arrangement, is not intended as limiting. For example, a mapping arrangement can be used in another embodiment in place of the tension monitoring arrangement. Such a mapping arrangement can operate, for example, using an inertial navigation system (INS).

FIG. 6 is a block diagram which illustrates an embodiment of electronics section 56 in further detail. Section 56 can include an inground digital signal processor 510 which can facilitate all of the functionality of transceiver 64 of FIG. 1. Sensor section 68 can be electrically connected to digital signal processor 510 via an analog to digital converter (ADC) 512. Any suitable combination of sensors can be provided for a given application and can be selected, for example, from an accelerometer 520, a magnetometer 522, a temperature sensor 524 and a pressure sensor 526 which can sense the pressure of drilling fluid prior to being emitted from the drill string and/or within the annular region surrounding the downhole portion of the drill string. Adapter/Isolator 60 is diagrammatically shown as separating uphole portion 400 of the drill string from downhole portion 402 of the drill string for use in one or both of a transmit mode, in which data is coupled onto the drill string, and a receive mode in which data is recovered from the drill string. The electronics section is connected, as illustrated, across an electrically insulating/isolating break formed by the isolator by a first lead 528*a* and a second lead 528*b* which can be referred to collectively by the reference number 528. In an embodiment using a current transformer, these leads can be connected to the current transformer leads. For the transmit mode, an antenna driver section 530 is used which is electrically connected between inground digital signal processor 510 and leads 528 to directly drive the drill string. Generally, the data that can be coupled into the drill string can be modulated using a frequency that is different from any frequency that is used to drive a dipole antenna 540 that can emit aforedescribed signal 66 (FIG. 1) in order to avoid interference. When antenna driver 530 is off, an On/Off Switcher (SW) 550 can selectively connect leads 528 to a band pass filter (BPF) 552 having a center frequency that corresponds to the center frequency of the data signal that is received from the drill string. BPF 552 is, in turn, connected to an analog to digital converter (ADC) 554 which is itself connected to digital signal processing section 510. Recovery of the modulated data in the digital signal processing section can be readily configured by one having ordinary skill in the art in view of the particular form of modulation that is employed.

Still referring to FIG. 6, dipole antenna 540 can be connected for use in one or both of a transmit mode, in which signal 66 is transmitted into the surrounding earth, and a receive mode in which an electromagnetic signal such as, for example, signal 434 of FIG. 5 is received. For the transmit mode, an antenna driver section 560 is used which is electrically connected between inground digital signal processor 510 and dipole antenna 540 to drive the antenna. Again, the frequency of signal 66 will generally be sufficiently different from the frequency of the drill string signal to avoid interference therebetween. When antenna driver 560 is off, an On/Off Switcher (SW) 570 can selectively connect dipole antenna 540 to a band pass filter (BPF) 572 having a center frequency that corresponds to the center frequency of the data signal that is received from the dipole antenna. BPF 572 is, in turn, connected to an analog to digital converter (ADC) 574 which is itself connected to digital signal processing section 510. Transceiver electronics for the digital signal processing section can be readily configured in many suitable embodiments by one having ordinary skill in the art in view of the particular form or forms of modulation employed and in view of this overall disclosure. The design shown in FIG. 6 can be modified in any suitable manner in view of the teachings that have been brought to light herein.

Referring to FIGS. 1 and 7, the latter is a block diagram of components that can make up an embodiment of an aboveground transceiver arrangement, generally indicated by the reference number 600, that is coupled to drill string 16. An aboveground current transformer 602 is positioned, for example, on drill rig 14 for coupling and/or recovering signals to and/or from drill string 16. Current transformer 602 can be electrically connected for use in one or both of a transmit mode, in which data is modulated onto the drill string, and a receive mode in which modulated data is recovered from the drill string. A transceiver electronics package 606 is connected to the current transformer and can be battery powered or powered by the drill rig such that an essentially unlimited amount of electrical power is available. In this regard, the uphole transmit power is generally always greater than the downhole transmit power for a downhole transceiver that is battery powered. Thus, the downhole transmit power is selectable within a downhole transmit power range which is below the minimum uphole transmit power such that the uphole power is always greater than any selected downhole transmit power. In an embodiment, the maximum downhole transmit power can be as low as 1 watt. Generally, it can be difficult to achieve a maximum power in excess of 5 watts on battery power. In an embodiment higher power levels such as, for example, 3-5 watts can be achieved in an embodiment by using a super capacitor to store the energy from the battery. However, the duty cycle will be limited, due to the limited energy capacity of the super capacitor. In contrast, the uphole transmit power, even at a minimum value, can be 100 watts. For the transmit mode, an antenna driver section 610 is used which is electrically connected between an aboveground digital signal processor 618 and current transformer 602 to drive the current transformer. Again, the data that can be coupled into the drill string can be modulated using a frequency that is different from the frequency that is used to drive dipole antenna 540 in inground housing 54 (FIGS. 1 and 6) in order to avoid interference as well as being different from the frequency at which isolator 60 drives a signal onto the inground end of the drill string. When antenna driver 610 is off, an On/Off Switcher (SW) 620 can selectively connect current transformer 602 to a band pass filter (BPF) 622 having a center frequency that corresponds to the center frequency of the data signal that is received from the drill string. BPF 622 is, in turn, connected to an analog to digital converter (ADC) 630 which is itself connected to digital signal processing section 618. It should be appreciated that digital signal processing section 618 and related components, which comprise an uphole transceiver, can form part of processing arrangement 46 (shown using a dashed line) of the drill rig or can be connected thereto on a suitable interface 634. Transceiver 606 can send commands to the inground tool for a variety of purposes such as, for example, to control transmission power, select a modulation frequency, change data format (e.g., lower the baud rate to increase decoding range) and the like. Transceiver electronics for the digital signal processing section can be readily configured in many suitable embodiments by one having ordinary skill in the art in view of the particular form or forms of modulation employed and in view of this overall disclosure.

Still referring to FIGS. 1 and 7, in a repeater embodiment, another inground isolator arrangement 640 (shown within a dashed box), can replace current transformer 602 along with another instance of inground housing 54. Arrangement 640 can include any suitable embodiment of inground adapter/isolator according to the present disclosure including another instance of the isolator that is in use at the inground tool. The isolator, in this arrangement, is connected to transceiver 606 (FIG. 6) and is inserted as a unit into one of the joints of the drill string to serve in the manner of a repeater, by way of example, 1000 feet from the inground tool. Thus, a section 400' of the drill string can connect the isolator to the drill rig while a section 402' of the drill string serves as an intermediate section of the drill string between isolator arrangement 640 and isolator 60 at the inground tool. The repeater unit can be inserted, for example, in the joint formed between drill pipe sections 1 and 2 in FIG. 1. The inground housing, for use in a repeater application, can include a box fitting at one end and a pin fitting at an opposing end. Of course, one of ordinary skill in the art will recognize that box to pin fitting adapters are well known and readily available. In another embodiment, isolator arrangement 640 can be inserted into a joint with the repeater electronics housed in a pressure barrel that can be supported by centralizers within the through passage of an adjacent drill pipe section. In yet another embodiment, the repeater electronics can be placed in an end loaded or side loaded housing and inserted into the drill string with electrical communication to the isolator. Such end or side loaded housings can include passages that allow for the flow of drilling fluid therethrough. In any of these embodiments, of course, the repeater electronics can be electrically connected to the isolator in a manner that is consistent with the descriptions above. In order to avoid signal interference and by way of non-limiting example, a repeater can pick up the signal originating from the inground tool or another repeater at one carrier frequency and the repeater electronics can retransmit the signal up the drill string at a different carrier frequency in order to render the signals distinguishable from one another. As another example, suitable modulation can be used to make the signals distinguishable. Thus, the repeater electronics package can be housed in any suitable manner in electrical communication with the signal coupling arrangement of the isolator for producing a repeater signal based on the received data signal, but which is distinguishable from the received data signal.

Figure 8:
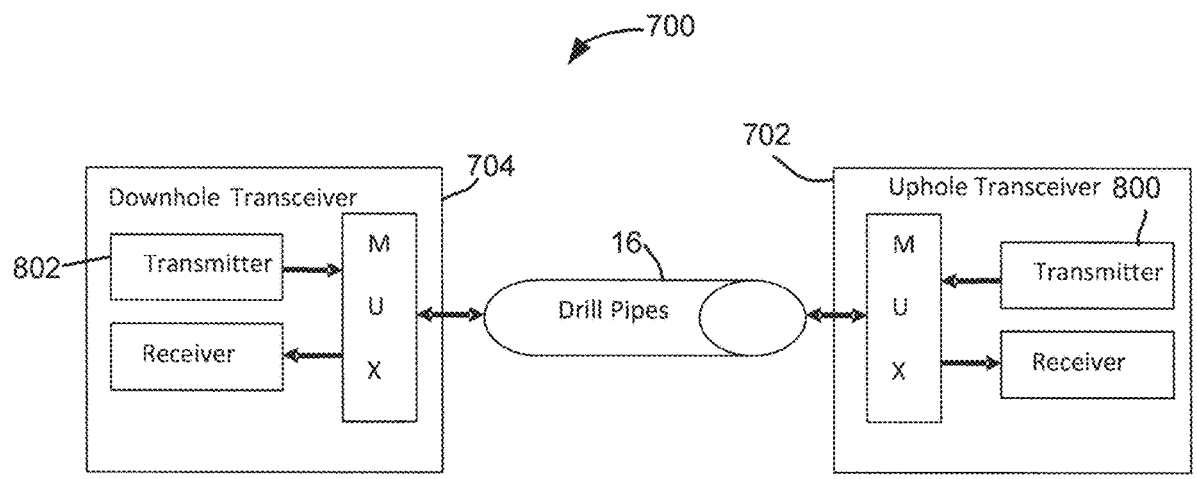
FIG. 8 is a block diagram of an embodiment of an advanced bidirectional drill string communication system.

Attention is now directed to FIG. 8 which is a block diagram that illustrates an embodiment of an advanced bidirectional drill string communication system that is generally indicated by the reference number 700. System 700 includes an uphole transceiver 702 and a downhole transceiver 704. Uphole transceiver 702 can at least generally include the features of previously described transceiver 600 of FIG. 7 while downhole transceiver 704 can at least generally include the features of previously described downhole transceiver 56 of FIG. 6, including provisions for transmitting a locating signal. Thus, this bi-directional communication system can send data in both directions over the drill pipes/rods that make up drill string 16. Applicants recognize that system 700 provides benefits by avoiding the transmission of at least some signals through the ground at least for the reason that an electromagnetic signal transmitted, for example, from dipole antenna 540 (FIG. 6) experiences a loss in signal strength with distance that is proportional to the inverse cube of the distance. For a given transmission power, an increase in communication range should be available by transmission using the drill string as an electrical conductor. The techniques that are brought to light hereinafter provide still further enhancement using such bidirectional communication via the drill string.

Applicants recognize that there are some challenges with respect to transmitting electrical signals through the drill string. For example, the drill rig can electrically couple electrical/electronic noises from its system into the drill string. As another example, electromagnetic noise can be present along the drill path emanating, for example, from underground electrical power lines and tracer wires associated with fiber optic cables and the like. This noise can couple onto the drill string via conductivity of the soil. As still another example, signal distortion can be produced by the drill rods that make up the drill string, the interconnection between the drill rods, and the soil surrounding the drill string. The detailed discussions which follow characterize signal degradation in terms of noise and distortion effects on the electrical signal carried by the drill string and, thereafter, present at least three methods and associated apparatus that are directed to further enhancing such a communication system. As will be seen, these methods relate to: (1) noise scanning, (2) equalization and (3) training or customizing the receiver.

As discussed above, electrical noise in the drill string can be coupled to the drill string from the drill rig and/or from inground sources in the soil such as underground power lines via electrical conduction of the soil. These noises are dependent on the surrounding environment at the drilling site and, therefore, can be variable from one site to another. Accordingly, it is assumed that the noise is represented by a function (t) and is both broadband and narrow band. By way of non-limiting example, narrow band noise includes fundamentals of 50 or 60 cycle power line noise while broadband noise includes power line communication (PLC), motor controller noise and harmonics of the 50 or 60 cycle power line frequencies.

Figure 9:
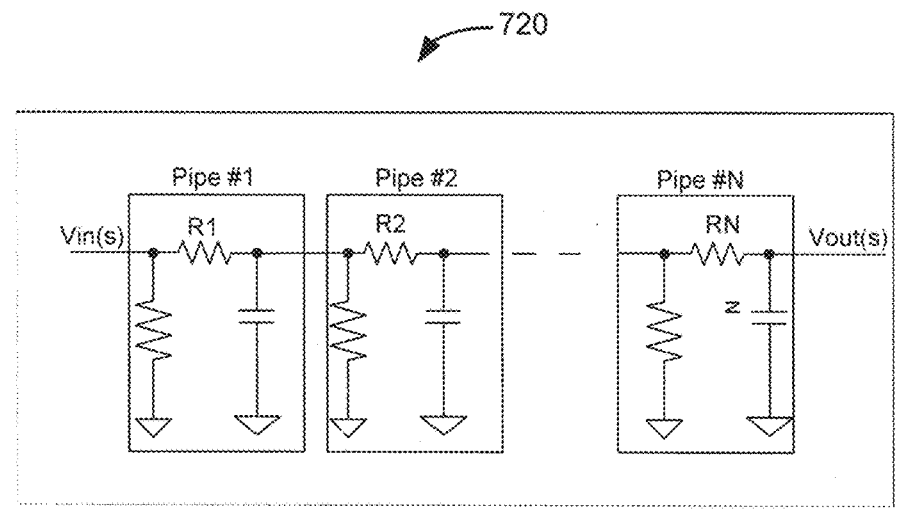
FIG. 9 is an approximated model of a drill string that is made up of removably connectable electrically conductive drill pipe sections.

Distortion can be caused by the electrical parasitic elements introduced by the drill rods such as the interconnections between the drill rods and from conduction in the soil surrounding the drill string. FIG. 9 illustrates one approximated model for the drill string in soil generally indicated by the reference number 720. The drill string is made up of N drill rods and the conduction in the soil is at least somewhat difficult to define however; it can be approximated by the model that is shown. Such an electrical model can be represented by the following mathematical Laplace representation:

$$\frac{V_{out}(s)}{V_{in}(s)} = C(s)|_{s=j\omega} = \frac{1}{\prod_{i=0}^{N-1}(1+a_i s)} \quad \text{EQ (1)}$$

Where $a_i$ is a constant and is defined by the electrical parasitic resistors and capacitors of the model and the conduction in the soil, for example, as illustrated in FIG. 9. The term "channel" can refer to the full path length of the interconnecting drill pipe sections extending between downhole transceiver 704 and uphole transceiver 702. Hereinafter, channel can refer to the electrical characteristics of the overall drill string. Equation EQ(1) can be referred to as the transfer function of the channel. Equation EQ(1) can be expressed in a more familiar form as shown below:

$$C(s) = \frac{1}{\sum_{i=0}^{N-1} b_i s^i} \quad \text{EQ (2)}$$

Equation EQ(2) reveals that the channel acts on the transmitted signal like a band limiting filter. Equation EQ(2) has a time domain representation, as follows:

$$c(t) = \mathcal{L}^{-1}\{C(s)\} \quad \text{EQ (3)}$$

Where $\mathcal{L}^{-1}$ denotes the inverse Laplace transform. The interaction of noise and distortion with the electrical signal carried by the drill pipe sections that make up the drill string are discussed immediately hereinafter.

Figure 10A:
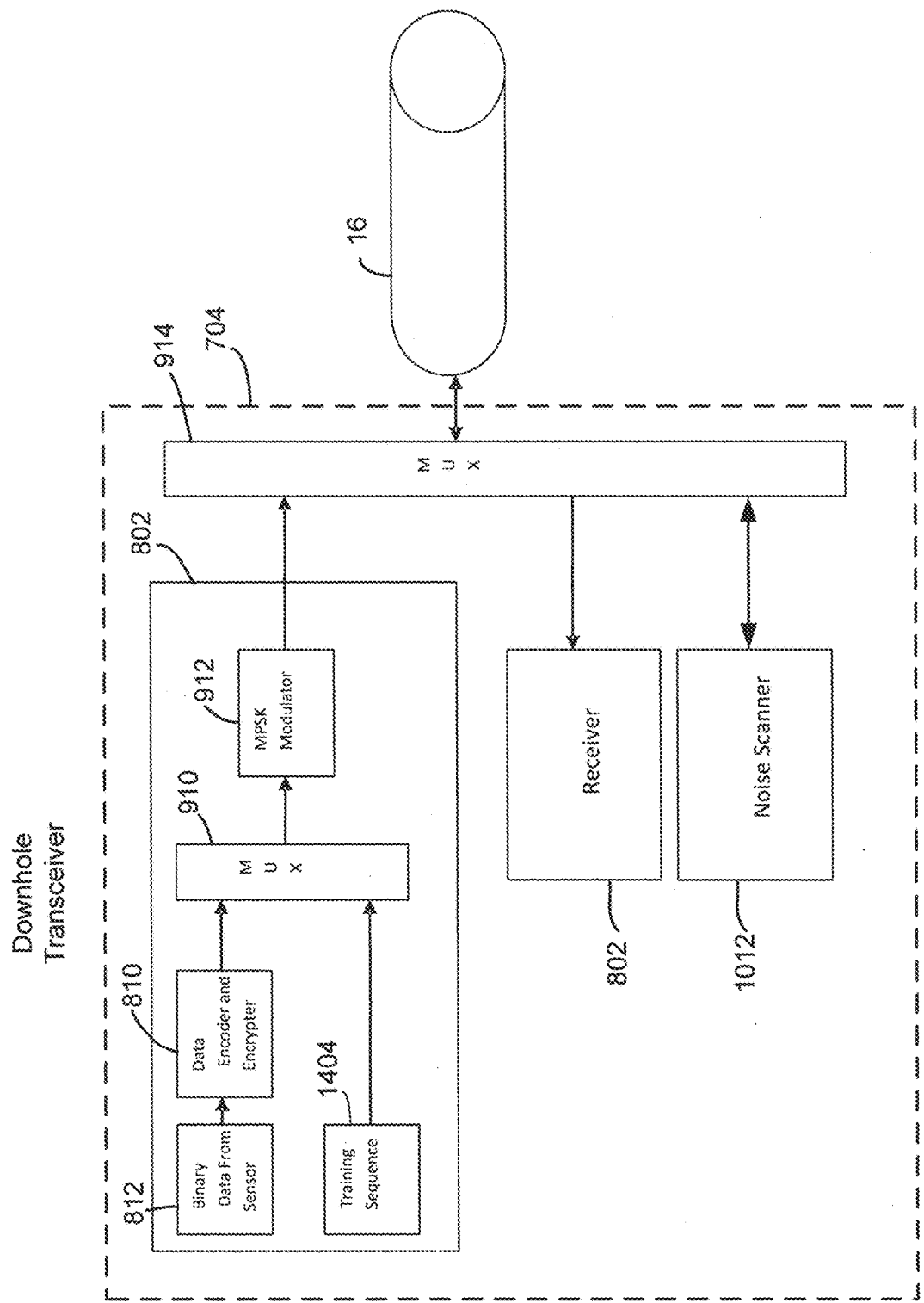
FIGS. 10a and 10b are block diagrams of embodiments depicting details of an advanced downhole transceiver and an advanced uphole transceiver, respectively.
Figure 10B:
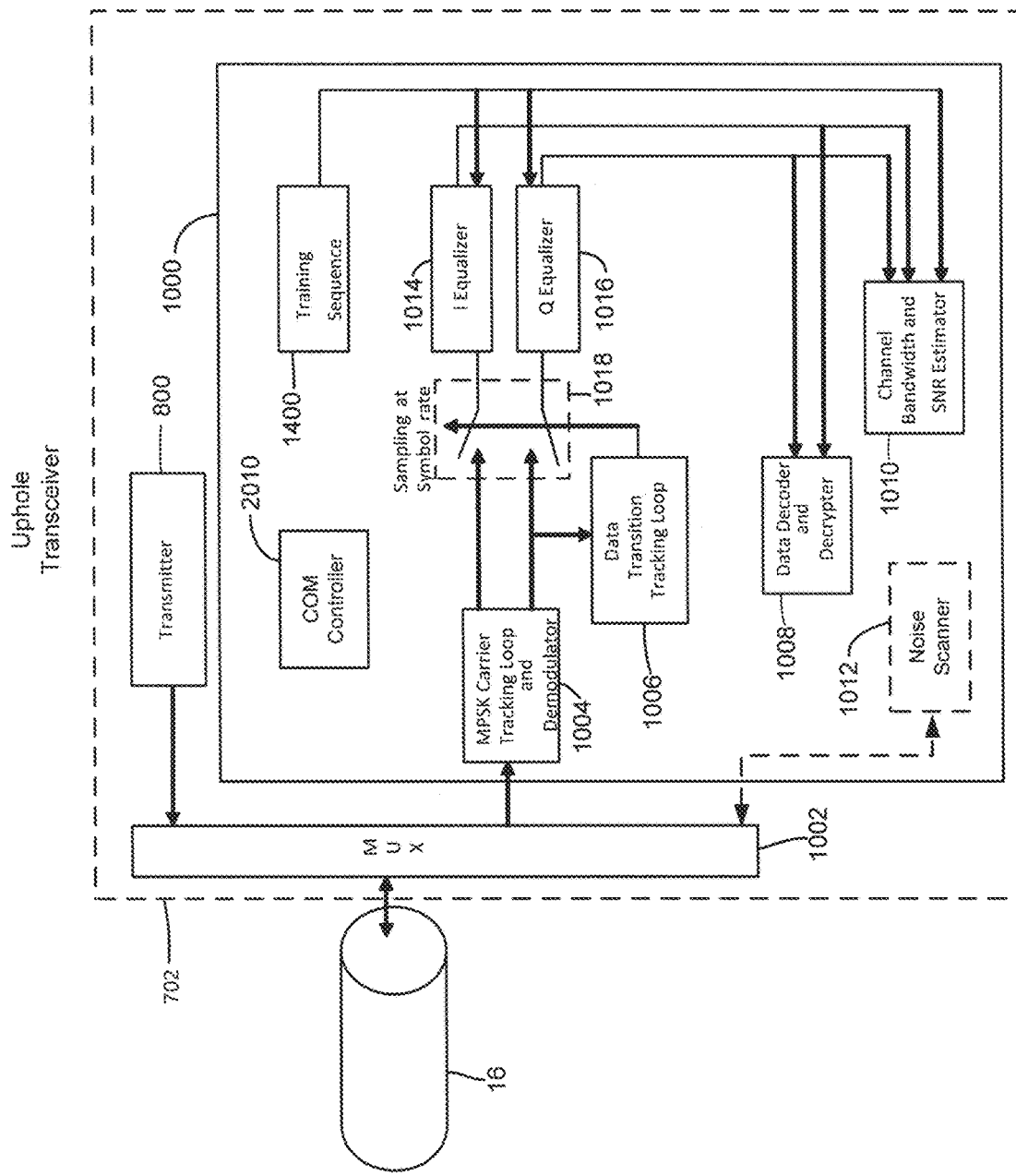

Attention is now directed to FIGS. 10a and 10b which are block diagrams depicting details with respect to downhole transceiver 704 and uphole transceiver 702, respectively. Initially, it is noted that transmitter 800 of uphole transceiver 702 can be of any suitable type such as, for example, using an H Bridge configuration for purposes of driving current transformer 602 (FIG. 7). The signal generated by transmitter 800 can be received by receiver 802 in downhole transceiver 704 using a receiver that is of any suitable type such as, for example, including a front end protection circuit coupled to a low noise pre-amplifier, which is in turn followed by a bandpass filter that is coupled to an analog to digital converter and a digital signal processor. It is noted in this regard, that such receivers are often used for purposes of receiving locating signal 66. With regard to transmitter 800 and receiver 802, Applicants have recognized that an essentially unlimited amount of power is available at the drill rig for purposes of punching through communication to the downhole transceiver, as will be further discussed below. Transmitter section 802 in downhole transceiver 704 receives sensor data 812 that is converted to digital form. The sensor data is encoded and encrypted by a data encoder/encryption section 810. It should be appreciated, in this regard that data encryption is not a requirement. While the embodiments described herein employ variants of Phase Shift Keying, by way of non-limiting example, it is to be appreciated that any suitable form of modulation, either currently available or yet to be developed, can be utilized while still relying on the teachings that have been brought to light herein. Other suitable modulation schemes include, for example, Frequency Shift Keying (FSK) and Manchester encoding. A multiplexer 910 can then selectively couple the data to an MPSK (Multiple Phase Shift Keying) modulator 912 for modulation onto a carrier. The MPSK modulator can perform $2^M$ phase modulation where M={1,2,3,4}. A multiplexer 914 can then select the modulated signal for electromagnetic coupling onto the drill string. The coupled signal can have a mathematical representation in the form:

$$y(t) = \sqrt{P_T}\cos(\theta_k)d(t)\cos(2\pi f_c) + \sqrt{P_T}\sin(\theta_k)d(t)\sin(2\pi f_c) \quad \text{EQ (4a)}$$

Where $P_T$ is the transmitted power, $f_c$ is the carrier frequency, $\theta_k$ is the carrier phase which represents the data bits and d(t) is the baseband signal. For example, if M=1 then MPSK becomes BPSK (Binary-Phase Shift Keying) with the mapping of the binary data according to:

$$\{0,1\} \Leftrightarrow \left\{\frac{-\pi}{2}, \frac{\pi}{2}\right\} \text{ or } \{0,1\} \Leftrightarrow \{0, \pi\} \quad \text{EQ (4b)}$$

As another example, for M=2, MPSK becomes QPSK (Quadrature-Phase Shift Keying) which maps two binary data bits to one of four phases. One mapping of QPSK for two bits to carrier phase $\{\theta_k\}$ is shown below:

$$\begin{bmatrix} 0,0 \\ 0,1 \\ 1,0 \\ 1,1 \end{bmatrix} \Leftrightarrow \begin{bmatrix} \pi/4 \\ 3\pi/4 \\ 5\pi/4 \\ 7\pi/4 \end{bmatrix} \quad \text{EQ (4c)}$$

Accordingly, the four carrier phase values represent four data symbols in a QPSK embodiment.

In equation EQ(4a), d(t) represents the baseband signal which can be defined as follows:

$$d(t) = \sum_{k=0}^{N} p(t - kT_b) \quad \text{EQ (5a)}$$

Where $T_b$ is the bit duration and p(t) can be defined as follows:

$$p(t) = \begin{cases} 1, & 0 \le t \le T_b \\ 0, & t > T_b \end{cases} \quad \text{EQ (5b)}$$

Responsive to transmission of an electrical signal on the drill string, the signal is corrupted by noise and distortion upon reaching a receiver, for example, at an opposing end of the drill string. The corrupted, received signal can be stated mathematically as follows:

$$r(t) = \quad \text{EQ (6a)}$$
$$\sqrt{P_L P_T} \cos(\theta_k) f(t) \cos(2\pi f_c) + \sqrt{P_L P_T} \sin(\theta_k) f(t) \sin(2\pi f_c) + n(t)$$

Where $P_L<1$ represents the power loss of the transmitted signal in propagating through the drill pipe sections subject, for example, to leakage into electrically conductive soil. The term n(t) represents the noise that is induced onto the drill string from the surrounding environment, which is additive to the transmitted signal. Function f(t) represents the baseband waveform which has been distorted by the channel and can be defined as follows:

$$f(t) = d(t) * c(t) = \int_{-\infty}^{\infty} d(\tau) c(t - \tau) d\tau \quad \text{EQ (6b)}$$

Where * denotes a convolution operation, d(t) was defined in EQ(5a) and c(t) was defined in EQ(3). The signal defined in equation EQ(6a) arrives, for example, at uphole transceiver 702 where it can be demodulated and decoded to recover the baseband binary data $\{\cos(\theta_k), \sin(\theta_k)\}$.

FIG. 10b is a block diagram that illustrates an embodiment of uphole transceiver 702. In this embodiment, the uphole transceiver includes an uphole receiver 1000. The latter can be placed selectively in communication with drill string 16 via a multiplexer 1002 and using a suitable coupling arrangement such as current transformer 602. Receiver 1000 includes a carrier tracking loop and demodulator 1004 which tracks the carrier frequency and phase of the received signal and can then coherently/synchronously demodulate the carrier. Of course, the specific type of carrier tracking loop and demodulator that is selected is complementary to the modulator that is used in the downhole transceiver. A Data-Transition-Tracking Loop (DTTL) 1006 can also be employed to track bit timing transitions so that $\{\cos(\theta_k), \sin(\theta_k)\}$ can be decoded with increased accuracy. Thus, in this embodiment, synchronous operation of the uphole receiver can enhance communication capabilities in and by itself. Synchronous detection provides at least the benefit of signal detection using a relatively more narrow bandwidth. A data decoder/decrypter 1008 is used which is complementary to uphole data encoder and decrypter 810. A channel bandwidth and signal to noise ratio estimator 1010 can track an inverse relationship of the bandwidth to the signal to noise ratio. For example, as distance increases, the level of signal loss increases correspondingly. In order to maintain a given signal to noise ratio with increasing distance, it is generally necessary to decrease the bandwidth and/or increase signal power, if more power is available. Additional measures can be taken to still further mitigate the effects of noise and distortion with respect to enhancing communication between the downhole and uphole transceivers via the drill pipe sections. As discussed in detail below, these measures can include but are not limited to: (1) Noise scanning, (2) Equalization, and (3) the application of a Training Sequence.

Noise Scanning

Referring to FIG. 10a, electrical noise carried by drill string 16 can greatly reduce the useful range of a transmitted signal. In one embodiment, transmission of drill string signals on noisy frequencies can be avoided. Therefore, a noise scanner 1012 can determine which frequencies are the least noisy. It is noted that noise scanner 1012 is also shown in phantom in FIG. 10b. Because uphole noise and downhole noise can be quite different, either one or both of these noise scanners can be provided and utilized. Any one of a number of suitable methods can be used to determine which frequencies are noisy and which are not. By way of non-limiting example, the noise spectrum can be determined, for example, using FFT (Fast Fourier Transform), DFT (Discrete Fourier Transform) or PSD (Power Spectral Density) over any desired bandwidth or at predetermined frequencies. In this regard, commonly owned U.S. Published Patent Application no. 2011-0001633 (U.S. Ser. No. 12/497,990), filed on Jul. 6, 2009 is incorporated herein by reference in its entirety and describes techniques for the determination of noise spectrums. In the present application, it can be more effective to scan for noise with the transmitters of both the uphole and downhole transceivers off. With the transmitters off and assuming that noise signal n(t) represented in EQ(6a) is sampled at F's, the sampling frequency, samples per second then the FFT of $$r[i] = r(t)_{t=\frac{i}{T_s}}$$

$$|R(f)|^2 = |\mathcal{F}\{r(i)\}|^2 = |\mathcal{F}\{n(i)\}|^2 \qquad \text{EQ (7)}$$

Equation EQ(7) can provide the magnitude of noise as a function of frequency at least over the bandwidth of $[-0.5\ F_s, 0.5\ F_s]$. The desired frequency for transmission can be an available frequency that has a minimum value $|R(f)|^2$.

In another embodiment, noise scanner 1012 can comprise a filter bank such as, for example, a bank of bandpass filters or a bank of Goertzel filters to determine over a set of frequencies which frequencies are noisy and which are not. The bandwidths of the various filters that make up the filter bank can be customized in any suitable manner. The noise power measured from the k'h filter of the filter bank is $$P_{n,i} = \int_{-\infty}^{\infty} |H_i(f)|^2 |R(f)|^2 df = \int_{-\infty}^{\infty} |H_i(f)|^2 |F\{n(i)\}|^2 df \qquad \text{EQ (8)}$$

Since each filter in the filter bank can be at a frequency of interest, the filter which yields the minimum value of $P_n$ can be selected as the least noisy frequency. It should be appreciated that any suitable type of filter can be used so long as the filter provides the ability to determine the power at a particular frequency or within a frequency band. Suitable filter embodiments include FIR (Finite Impulse Response) and IIR (Infinite Impulse Response) filters, by way of non-limiting example.

Signal Distortion Correction

In view of the foregoing discussions, it has been demonstrated that the channel, made up of removably attached drill pipe sections behaves, at least from a practical standpoint, like a band limiting filter such as, for example, an FIR (Finite Impulse Response) filter. Transmitting a signal over this channel results in distortion as shown by EQ(6a) and EQ(6b). Applicants appreciate that this type of distortion causes the baseband waveform to spread out. Such a phenomenon is known as Inter-Symbol-Interference (ISI) and has the effect of lowering the signal to noise ratio (SNR) which shortens the useful range of the communication between the downhole and uphole transceivers. ISI can be corrected using a compensation response that can be applied through the use of equalizers. As will be seen, an equalizer includes an equalizer response that is customizable based on a set of equalizer coefficients such that the equalizer response is adaptable to a range of variation in the channel transfer function. In essence, an equalizer can be considered as another FIR filter (also known as a de-convolution filter) at the receiver with coefficients to be determined based on the minimum mean square error (MMSE) of the difference between an estimate of the channel response and the measured data. Referring to FIG. 10*b*, an in-phase equalizer 1014 and a quadrature phase equalizer 1016 selectively receive symbol inputs from a switching section 1018 that is switched responsive to DTTL 1006. Generally, switching is performed in 90 degree increments for the present embodiment. Other embodiments can use suitable, but different switching increments. Assuming that the received signal has been demodulated successfully so that baseband data is recovered, equation EQ(6a) reduces to in-phase and quadrature phase components:

$$r_I(k) = \sqrt{P_L P_T} \cos(\theta_k) d(k) * b(k) + n_1(k) \qquad \text{EQ (9a)}$$

$$r_Q(k) = \sqrt{P_L P_T} \sin(\theta_k) d(k) * b(k) + n_Q(k) \qquad \text{EQ (9b)}$$

Where b(k) is the channel approximation based on an FIR function. It should be appreciated that EQ(9a) and EQ(9b) can be processed at a symbol rate (see EQ(4c). The character "*" denotes the convolution process.

It is desired to estimate or characterize coefficients for the band limiting channel b(k). In an embodiment, the coefficients b(k) can be determined by collecting N+1 samples of $r_I(k)$ or $r_Q(k)$. It should be appreciated that either one can be used since the channel coefficients b(k) are the same in both cases. Accordingly, it is not necessary to use both $r_I(k)$ and $r_Q(k)$ to determine channel response b(k). Accordingly:

$$\begin{bmatrix} r_I(0) \\ r_I(1) \\ \cdot \\ \cdot \\ r_I(N) \end{bmatrix} = \sqrt{P_L P_T} \begin{bmatrix} \cos(\theta_0)d(0) & 0 & \cdots & & 0 \\ \cos(\theta_1)d(1) & \cos(\theta_0)d(0) & 0 & \cdots & 0 \\ \cdot & & & & \cdot \\ \cdot & & & & \cdot \\ \cos(\theta_N)d(N) & \cdot & \cdots & \cos(\theta_{(N+1)-M})d((N+1)-M) \end{bmatrix} \begin{bmatrix} b(0) \\ b(1) \\ \cdot \\ \cdot \\ b(N) \end{bmatrix} + \begin{bmatrix} n_I(0) \\ n_I(1) \\ \cdot \\ \cdot \\ n_I(N) \end{bmatrix} \qquad \text{EQ. (10)}$$

In vector form (i.e. over N+1 samples), equation EQ(10) can be written as:

$$r_1(k) = H_I(k)b(k) + n_I(k) \qquad \text{EQ (11a)}$$

$$r_Q(k) = H_Q(k)b(k) + n_Q(k) \qquad \text{EQ (11b)}$$

Where $r_I(i)$ and $r_Q(i)$ are (N+1) column vectors, $H_I(i)$ and $H_Q(i)$ are (N+1)×M matrices, and $n_I(i)$ and $n_Q(i)$ are (N+1) column vectors. In the form of equations EQ(11a) and EQ(11b), channel coefficients b(k) can be solved for using the minimum mean square error (MMSE) criteria discussed in Appendix A. Once the channel coefficients b(k) are estimated which is denoted as $\hat{b}(k)$, the data symbols $\cos(\theta_k)$ (with minimum ISI) can be determined from the equation below:

$$\begin{bmatrix} r_I(0) \\ r_I(1) \\ \cdot \\ \cdot \\ r_I(N) \end{bmatrix} = \begin{bmatrix} \hat{b}(0) & 0 & \cdots & & \cdot & 0 \\ \hat{b}(1) & \hat{b}(0) & 0 & \cdot & & 0 \\ \cdot & & & & & \cdot \\ \hat{b}(M-1) & \cdot & \cdots & & & \cdot \\ 0 & & \cdots & \hat{b}(M-1) & \cdot & \hat{b}(0) \end{bmatrix} \begin{bmatrix} \sqrt{P_L P_T}\cos(\theta_0) \\ \sqrt{P_L P_T}\cos(\theta_1) \\ \cdot \\ \cdot \\ \sqrt{P_L P_T}\cos(\theta_N) \end{bmatrix} + \begin{bmatrix} n_I(0) \\ n_I(1) \\ \cdot \\ \cdot \\ n_I(N) \end{bmatrix} \qquad \text{EQ. (12)}$$

Note, d(k) is always 1 for all value of k, therefore it has been omitted from the above equation for clarity. The general form of equations EQ(12) can be used to determine the minimum ISI of either $\cos(\theta_k)$ or $\sin(\theta_k)$ (i.e., the data symbols in the quadrature channel.) The in-phase and quadrature-phase components of equation EQ (6a) can be processed individually, as discussed previously or together. Equations EQ(9a) and (9b) can be re-written in complex form so that both the in-phase and the quadrature-phase components of EQ(6a) can be processed at the same time. In complex form, equations EQ(9a) and (9b) can be written as $$r_c(k) = z(k) * b(k) + n(k) \qquad \text{EQ (13a)}$$

$$\text{Where } z(k) = \sqrt{P_L P_T}\, \overline{d(k)(\cos(\theta_k) + j\sin(\theta_k))} \qquad \text{EQ (13b)}$$

$$n(k) = n_I(k) + n_Q(k) \qquad \text{EQ (13c)}$$

Where $j=\sqrt{-1}$. In vector form, equation EQ(13a) can be written as:

$$r_c(k) = Z(k)b(k) + n(k) \qquad \text{EQ (14)}$$

Note that Z(k) is now a matrix of size (N+1)×M. The channel coefficients, b(k) can be determined using Equation EQ(A13) in Appendix A. Likewise, the complex data symbol, z(k) shown by equation EQ(13b), can be determined as follows:

$$\begin{bmatrix} r_c(0) \\ r_c(1) \\ . \\ . \\ r_c(N) \end{bmatrix} = \begin{bmatrix} \hat{b}(0) & 0 & . & . & . & . & 0 \\ \hat{b}(1) & \hat{b}(0) & 0 & . & . & . & 0 \\ . & . & . & . & . & . & . \\ \hat{b}(M-1) & . & . & . & . & . & . \\ 0 & . & . & . & \hat{b}(M-1) & . & \hat{b}(0) \end{bmatrix} \qquad \text{EQ. (15)}$$

$$\begin{bmatrix} z(0) \\ z(1) \\ . \\ . \\ z(N) \end{bmatrix} + \begin{bmatrix} n_I(0) \\ n_I(1) \\ . \\ . \\ n_I(N) \end{bmatrix}$$

The complex data symbol z(k) can be determined using equation EQ(A13) in Appendix A.

Figure 11A:
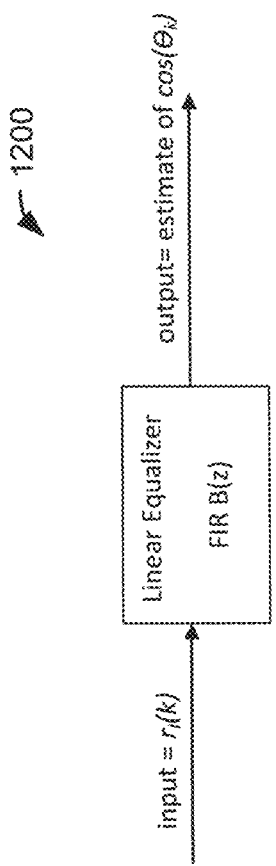
FIG. 11a is a block diagram of an embodiment of a linear channel equalizer.
Figure 11B:
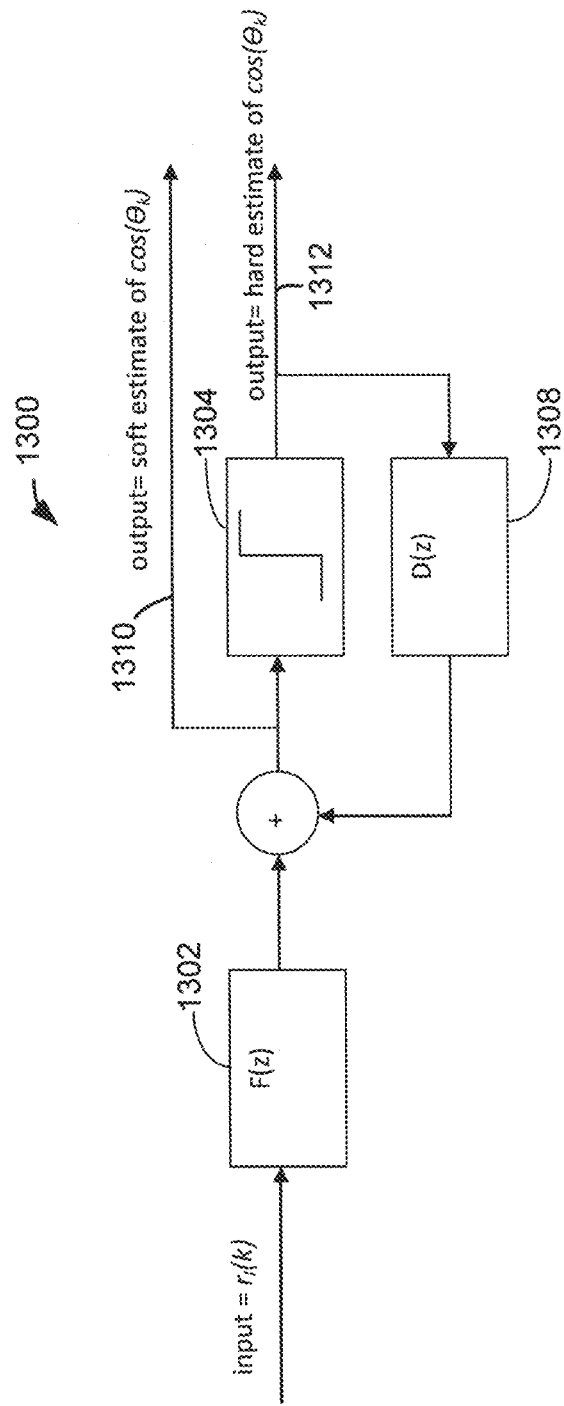
FIG. 11b is a block diagram of an embodiment of a decision feedback equalizer.

In general, ISI caused by an FIR channel can be corrected with the use of equalizers. FIGS. 11a and 11b diagrammatically illustrate the general embodiments of two equalizers that can be used in the context of FIG. 10b. In the instance of MPSK it is noted that the same embodiment of equalizer is generally used for the in-phase and quadrature-phase equalizer. A first equalizer 1200, in FIG. 11a, is a linear channel equalizer which uses current and prior measurements $r_I(k)$ or $r_Q(k)$ or $r_c(k)$, which contain noises, to cancel ISI.

FIG. 11b illustrates a second equalizer 1300 that is a non-adaptive Decision Feedback Equalizer (DFE) which uses prior estimated data bit to improve the cancellation of ISI. The DFE includes a feed forward filter 1302, a threshold detector 1304 and a feedback filter 1308. Feed forward filter 1302 and feedback filter 1308 serve as linear components while detector 1304 introduces the nonlinearity element of the filter. In an embodiment and by way of non-limiting example, the threshold detector can be set up for a logic level 1 if the voltage is greater than or equal to zero and a logic level-1 if the voltage is less than zero. The input to feedback filter 1308 is the last-determined bit from detector 1304. By adding the output of feedback filter 1308 to the output from feedforward filter 1302, ISI can be reduced from an estimated bit. Equalizer 1300 outputs a soft estimate 1310 of each data bit as well as a hard-limiter estimate 1312 of each data bit. A "soft" data bit refers to a bit that can be represented by any suitable voltage value or any suitable amplitude value. For example, a soft estimate data bit can have a value of {+a, −b} where "a" represents any voltage or amplitude value and b represents any voltage and amplitude value. That is, a soft estimate bit is not binary and can be characterized as one of a plurality of different values that satisfy a minimum mean square error condition when the equalizer 1300 converged. The minimum mean square error can be formulated by taking the mean of the difference of output 1310 and the transmitted data sequence. A "hard-limiter" data bit, on the other hand, is binary and refers to a bit (previously, a soft estimate bit) that is represented by a set of only two values. For example, a hard-limiter estimated bit can have a value of only {+1 or −1} or {+A or −A} where A is an amplitude or voltage value. A soft estimate of a data bit, output from the equalizer, can be provided to a soft-decision Forward-Error-Correction (FEC) decoder. The hard-limiter estimate bit, output from the equalizer, can be provided to a hard-decision FEC decoder or data de-encrypter. When the environment that is provided by the communication channel is known and expected to be relatively static/stable, F(z), the feed forward transfer function of feed forward filter 1302, and D(z), the feedback transfer function of feedback filter 1308 can be determined in advance, such that a non-adaptive equalizer can be used.

Figure 12A:
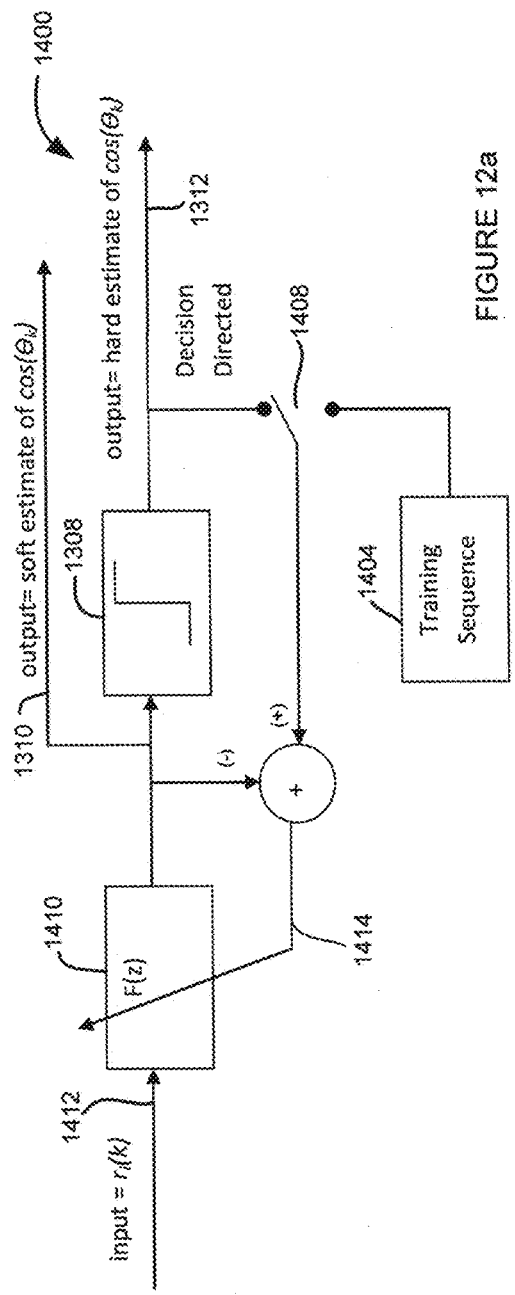
FIGS. 12a and 12b are block diagrams of embodiments of decision directed adaptive linear and decision feedback equalizers, respectively.

Another form of equalizer is an adaptive equalizer which relies either on the decision of the output of the equalizer or a training sequence to update the coefficients of the feed forward transfer function and feedback transfer function of the equalizer. FIG. 12a is a block diagram of an embodiment of an adaptive feed forward equalizer, generally indicated by the reference number 1400. In the present embodiment, the equalizer is adapted to the communication channel transfer function based on a selected one of hard-limiter output 1312 or through a training bit sequence 1404 (also shown in FIG. 10a). The training bit sequence can be accessed via a diagrammatically illustrated switch 1408. A feed forward filter 1410 receives an input 1412 from the communication channel. It should be appreciated that feed forward filter 1410 is distinct from feed forward filter 1302 of FIG. 11b at least for the reason that the coefficients of filter 1410 are adaptable to the changing communication channel transfer function. The coefficients of filter 1410 can be adjusted to drive an input error signal 1414 to a Minimum-Mean-Square Error (MSE) value. The error signal, which feed-forward filter 1410 uses to make adjustment to its coefficients, is diagrammatically indicated by a slanted line that transits across the feed forward filter. Error signal 1414 is formed by subtracting soft estimate 1310 from either the hard-limiter output bit sequence of the equalizer or a training bit sequence, depending upon the setting of switch 1408. While the coefficients of filter 1410 are adjusting, the MSE of error signal 1414 will trend toward either convergence or toward divergence to exhibit a negative slope or a positive slope, respectively, as a function of time. When MSE of the error signal 1414 exhibits a positive slope, the filter adaptation can be re-started with either a smaller adjustment step size or can use the training sequence. When MSE of the error signal 1414 exhibits a negative slope, that is the MSE of the error is trending smaller, the adaptation of the coefficients of feed-forward filter 1410 is converging. When MSE of the error signal 1414, as a function of time, is horizontal (i.e., a slope of zero,) then feed-forward filter 1410 has converged and adapted to the communication channel transfer function with a Minimum-Mean-Square Error value. When using training sequence and during the adaptation process with the training sequence, the transmitter must transmit the same training sequence over the communication channel to the receiver as the equalizer's adaption is taking place.

Using the training bit sequence, instead of an estimated bit sequence, to adaptively tune the coefficients of F(z) can provide better accuracy and better performance of the equalizer even at low signal-to-noise ratio (SNR). However, it should be remembered that training intervals must be dedicated to using the training bit sequence end-to-end in the system. That is, cooperation is needed between the uphole and downhole transceivers for the training process since the downhole transceiver transmits the training sequence to the uphole transceiver or vice versa. It should be appreciated that the uphole transmitter can transmit a training sequence to the downhole transceiver, if the latter includes equalizers. On the other hand, if hard-limiter output 1312 of the equalizer is used to adjust feed forward equalizer 1410 to tune the coefficients of F(z), dedicated training time is not necessary.

Figure 12B:
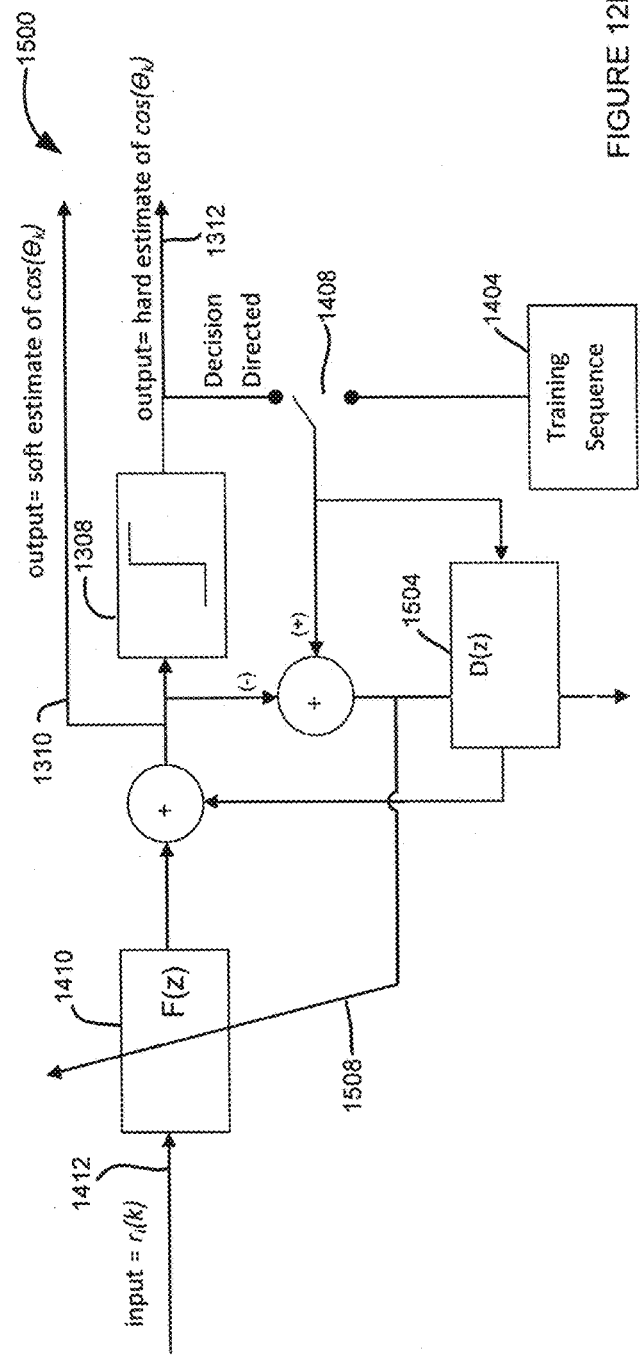

FIG. 12*b* is a block diagram of an embodiment of an adaptive Decision-Feed-Back (DFE) equalizer, generally indicated by the reference number 1500 which uses training sequence 1404 and is switchable, like equalizer 1400, between hard-limiter output 1312 and training sequence 1404 using switch 1408 for feedback purposes. Equalizer 1500 is a DFE equalizer which includes a feedback filter 1504. It should be appreciated that feedback filter 1504 is distinct from feedback filter 1308 of FIG. 11*b* at least for the reason that hard-limiter output bit 1312 of the equalizer or a training bit sequence can selectively be used to form an error signal 1508 which is then used to adaptively tune the coefficients of the feed-back filter D(z) 1504. Both feed-forward filter F(z) 1410 and feedback filter D(z) 1504 are adaptively tuned to the changing of the communication channel response using error signal 1508. The latter can be formulated by subtracting soft estimate output 1310 from either hard-limiter output 1312 of the equalizer or from training sequence 1404 depending upon the setting of switch 1408. Error signal 1508 is then fed to filters D(z) and F(z), diagrammatically indicated by a slanted or vertical line transiting through F(z) 1410 and D(z) 1504, where the coefficients of F(z) and D(z) filters are re-tuned to drive error signal 1508 to a minimum value. This minimum value can be called a Minimum-Mean-Square-Error (MMSE). When the MMSE is increasing, the coefficients of the filters are said to be diverging. In this case, the process can be reset and re-started with a smaller update step size or by using the training sequence for adaptation. When the MMSE is decreasing, the coefficients of the filters are said to be converging. When the profile of MMSE is flat (i.e., a slope of at least approximately zero) as a function of time or sample index, then the coefficients of filters F(z) and D(z) are said to be converged, and mean square error signal 1508 can be said to be at a minimum. When switch 1408 selects the training sequence, the coefficients of F(z) and D(z) are adaptively tuned to the changing communication channel transfer function by driving input error signals 1508, diagrammatically indicated by the slant or vertical line transits through F(z) 1410 and D(z) 1504, to a minimum value. While the equalizer in the uphole transceiver is in training with the training sequence, the downhole transceiver is also transmitting the same training sequence through the channel to the uphole transceiver. In another embodiment, the downhole transceiver can include the subject equalizers such that the uphole transceiver transmits the training sequence to the downhole transceiver. In such an embodiment, the uphole transceiver can include the componentry represented by FIG. 10*a* and the downhole transceiver can include the componentry represented by FIG. 10*b*. That is, equalizers, of any type described herein, can be provided in both the uphole and downhole transceivers. Once again, in the instance of MPSK it is noted that the same embodiment of equalizer is generally used for the in-phase and quadrature-phase equalizer.

In one embodiment, if ISI is caused primarily by the drill pipes, a channel model (i.e., transfer function) can be developed for the drill pipes in advance by predetermining the channel transfer function without introducing noise considerations and without the need for acquiring measured data that is subject to ambient noise in the drilling environment. In this case, the channel transfer function is a function of the electrical characteristic of the drill pipes and the number of pipes in the drill string. Therefore, the channel transfer function can be developed in advance as shown in equations EQ(1), EQ(2), and EQ(3).

Receiver Training

In an embodiment, the communication system of the present disclosure can employ a training sequence 1404 for purposes of training at least the equalizers in uphole receiver 702 of FIG. 10*b*. It is noted that the training sequence is also shown in the equalizers of FIGS. 12*a* and 12*b*. A number of receiver parameters can be determined from this process for purposes of communication enhancement. The channel bandwidth determines the frequency range or bandwidth that is effective for reaching the uphole transceiver. Viable frequencies can then be identified, at which the system is capable of operating, as parameters such that the lowest noise frequency that falls within the channel bandwidth can be used for communication. Other parameters include transmit power loss and noise power which can determine a minimum power that at least the downhole transmitter should use for transmission to the uphole receiver. It should be appreciated that significant enhancement of battery life in the downhole transceiver can be achieved by operating at minimum power while still maintaining sufficiently reliable communication. It can be desirable to select a training sequence of length L with an auto-covariance as follows:

$$R(k) = \sum_{k=0}^{L} t(i)t(i - kT_b) \begin{cases} = 1 \text{ when } k = 0 \\ \ll 1 \text{ when } k > 0 \end{cases} \quad \text{EQ (16)}$$

Where t(i) denotes the training sequence and $T_b$ is the bit duration. For the training to be effective, the receiver includes a copy of training sequence 1404 (FIG. 10*b*) of bits. Subsequent to transmission of the training sequence to the receiver, the receiver can then use the copy of the training sequence for comparison with the received training sequence in the calculation of the channel transfer function and the receiver signal-to-noise ratio (SNR). That is, the difference between the stored training sequence and the as-received training sequence output from the equalizer. The training sequence can also be used to train the adaptive equalizers once the error, which is the difference between the training sequence and the estimated sequence, reaches a minimum mean square value. FIGS. 12*a* and 12*b* illustrate how adaptive equalizers employ the training sequence. Once an adaptive equalizer reaches the optimum, minimum error solution, the channel bandwidth can be estimated as follows:

$$\text{Channel Bandwidth} = B_c = \int_{-\infty}^{\infty} |\hat{B}(f)|^2 df \quad \text{EQ (17)}$$

Where $\hat{B}(f)$ is the discrete Fourier transform of the transfer function of the equalizer. The received power for the data component can be determined assuming that the data component and the noise component are orthogonal and exhibit a zero mean. Assuming that the equalizer has reached an optimum solution, its output can be approximated as:

$$r_e(k) = \hat{z}(k) + n_e(k) \quad \text{EQ (18a)}$$

$$\hat{z}(k) = \sqrt{P_L P_T} \cos(\theta_k) + J\sqrt{P_L P_T} \sin(\theta_k) \quad \text{EQ (18b)}$$

Note that $\hat{z}(k)$ is an estimate of the training sequence $z(k)$ which is defined in equation EQ(13b) and that the estimate and the training sequence are at least approximately equal when the equalizer reaches the optimum solution. Therefore, the power of the signal component can be determined as follows:

$$R_d = \left| \frac{1}{L} \sum_{k=0}^{L-1} (\hat{z}(k) + n_e(k)) \frac{z*(k)}{\sqrt{P_L P_T} \, d(t)} \right|^2 = P_L P_T \quad \text{EQ (19)}$$

where $$\frac{z^*(k)}{\sqrt{P_L P_T} \, d(f)}$$

is the training sequence stored at the receiver. The received power for the noise component can be determined as follows:

$$R_n = \quad \text{EQ (20)}$$

$$\frac{1}{L} \sum_{k=0}^{L-1} (\hat{z}(k) + n_e(k))^2 - R_d \frac{1}{L} \sum_{k=0}^{L-1} \frac{z(k)}{\sqrt{P_L P_T}} \frac{z(k)}{\sqrt{P_L P_T}} = \frac{1}{M} \sum_{k=1}^{L} n_e(k)^2$$

Note, $d(k)$ is always 1 for all value of k therefore it has been omitted in EQ(20) for clarity. In equation EQ(20) the second sum term is the autocorrelation of the training sequence therefore it can be determined in advance. Again, result in EQ(20) is made possible from the assumption that the data component and the noise component are orthogonal with zero mean. With the received power for the data component and the noise component defined in EQ(19) and EQ(20), respectively, the signal to noise ratio at the receiver can be determined, as follows:

$$SNR = \frac{R_d}{R_n} \quad \text{EQ (21)}$$

Having trained the receiver equalizer, determined the channel bandwidth and the received signal-to-noise ratio, both the transmission frequency and the transmit power level of the transmitter can be set to provide for reliable and power efficient communication between the transmitter and the receiver.

System Operation

Figure 13A:
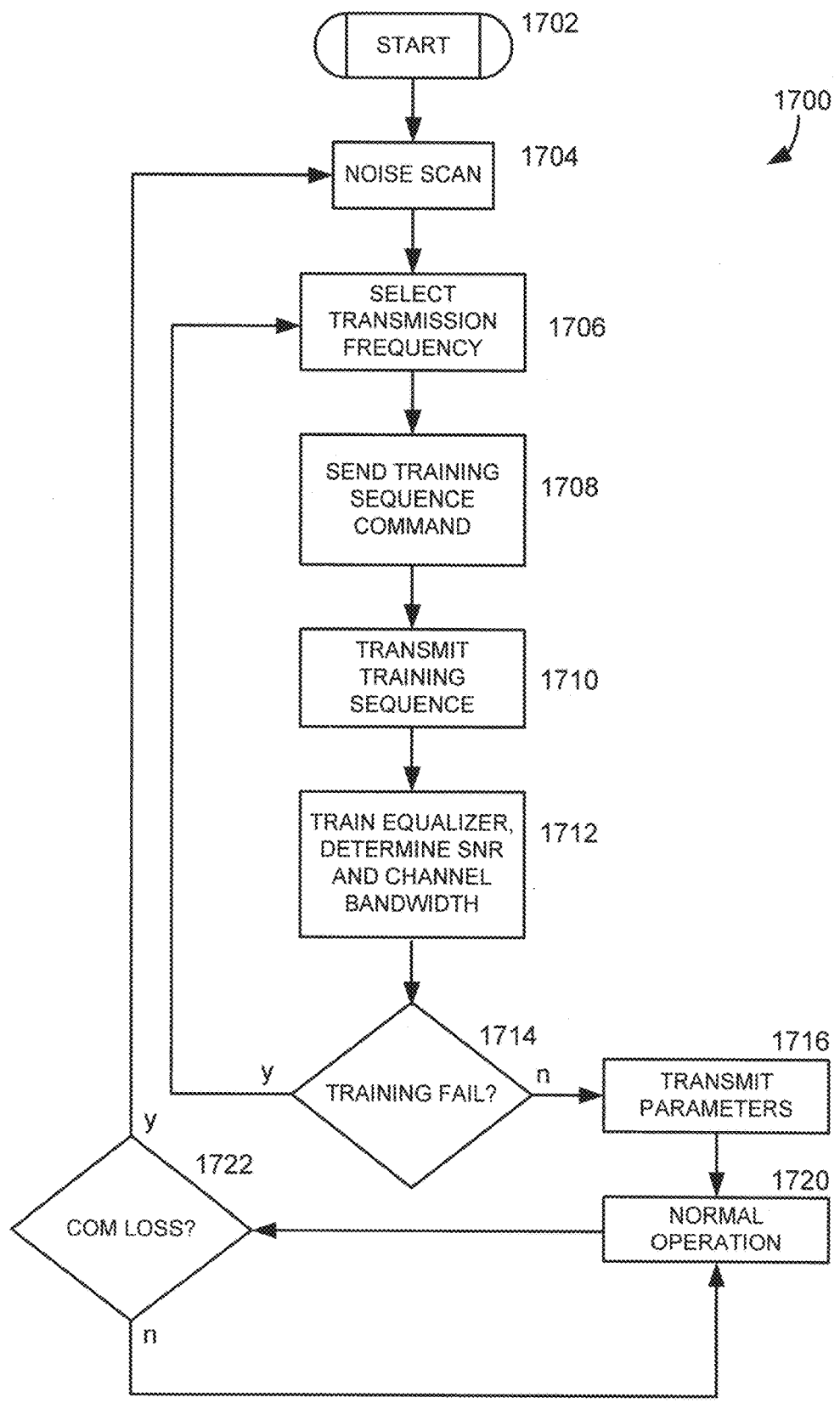
FIG. 13a is a flow diagram of an embodiment of a method for startup and re-initialization of the system of the present disclosure.

Attention is now directed to FIG. 13a which illustrates an embodiment of a method, generally indicated by the reference number 1700 that is applicable at least to startup and re-initialization of the system responsive to error conditions. The method can start at 1702 with power up. Upon power up and with the uphole and downhole transmitters off, at 1704, the downhole transceiver scans for noise using one of the methods discussed above such as, for example, described in above incorporated U.S. Published Patent Application no. 2011-0001633. It is noted that in another embodiment, the noise scanner can be in the uphole transceiver. After the noise scan, at 1706, the transceiver containing the appropriate noise scanner can select a transmission frequency that is determined to be least noisy. At 1708, the selected frequency is then used to send a command to the downhole transceiver with sufficient power to reach through. As noted above, Applicants recognize that essentially unlimited power is available at the drill rig such that communication can almost always be established from the drill rig to the inground equipment simply by employing sufficient transmit power. In an embodiment, the uphole transceiver can at least initially transmit the command using a maximum transmitter power. Embodiments can include a maximum power, for example, in a range from 2 Watts to at least 10 Watts. Some embodiments can include, for example, a maximum power up to 100 Watts or more based on the configuration of the signal coupling arrangement and electronics that are in use at the drill rig. The command, at 1708, identifies the frequency that the downhole transceiver should use to transmit the training sequence back to the uphole transceiver at the drill rig. At 1710, the downhole transceiver can transmit the training sequence, for example, using its maximum transmitter power. At 1712, the uphole transceiver trains its receiver equalizer responsive to the training sequence, determines the received Signal to Noise Ratio, and determines the bandwidth of the channel as described above. At 1714, if equalizer training fails, operation can return to 1706 for selection of a new transmission frequency followed by repeating subsequent steps of the method. The training failure decision at 1712, by way of non-limiting example, can be based on packet error rate, signal to noise ratio or any suitable combination thereof. Suitable thresholds for establishing unsuitable performance, by way of non-limiting example, can be 5 dB for SNR and 0.2 (20 percent) for packet/bit error rate in any context described herein relating to the quality of a signal that is transmitted on the drill string. In an embodiment, operation can return to 1704 to repeat the noise scan since ambient noise conditions may have changed since the last noise scan. In another embodiment, the operator can be provided with the option to manually set parameters such as the transmission frequency responsive to training failure and/or can manually override automatic frequency selection at any time during operation. Responsive to successful training or manual override, at 1716, the uphole transceiver has established at least a viable transmission frequency, what symbol data rate should be used, and what transmitter power setting should be used by the downhole transceiver for reliable communication while conserving battery power. These are summarized below:

Select transmitting frequency that is within the channel bandwidth (described by EQ(16)) and that is least noisy Select a symbol rate that uses less than the channel bandwidth.

Select transmitter power such that SNR>1.

At 1716, the operational parameters can be transmitted to the downhole transceiver. The parameter selection can be a complete set of automatically selected parameters or any combination of automatically and manually selected parameters. As an example of the latter, the frequency can be manually selected and all other parameters automatically selected. Further, the values of automatically selected parameters can be adjusted in view of the values of manually selected parameters. Normal operation can proceed at 1720. For example, once the downhole transceiver is configured with these parameters, the downhole transceiver can then start to transmit sensor data (FIG. 10*a*) up to the drill rig. It should be appreciated that procedure 1700 can automatically be repeated at predetermined intervals during operation such as, for example, at predetermined lengths of the drill string and/or at predetermined time intervals. In an embodiment, training can be performed at 100 foot extensions of the drill string although any suitable distance can be used and can be based on the dynamics of the communication channel. Further, the operator can be provided with a manual selection to initiate the method at any time. In an embodiment, at 1722, communication loss or some degree of degradation can be detected by the uphole transceiver during ongoing operation. By way of non-limiting example, packet error rate can be monitored to detect signal degradation. The bit error rate (BER) can be established on-the-fly, for example, by monitoring sync bits within the packet structure. In some embodiments, more than one aspect of signal degradation can be monitored such as, for example, BER and SNR. Any suitable technique can be employed for purposes of monitoring the quality of the signal either currently available or yet to be developed. It should be appreciated that such error rate monitoring can also be applied to locating signal 66, when it is modulated with appropriate data. Responsive to this detection, operation can return to noise scan 1704. Otherwise, normal operation resumes at 1720.

Battery Life and Communication Optimization

As evidenced by the descriptions above, Applicants recognize that the downhole transceiver can utilize just enough transmission power on drill string 16 to maintain communication at a sufficiently reliable level. As demonstrated by FIG. 13*a*, if the above ground transceiver experiences sufficient loss of data, due to distance and/or ground conditions, the uphole transceiver can instruct the downhole transceiver to take any number of actions either alone or in combination for purposes of improving communication. The available actions include (1) increasing the transmission power, (2) selecting a different transmission frequency, and (3) changing the baud rate of data transmitted up the drill string, thus trading baud rate to increase the signal to noise ratio. These actions can be employed either alone or in any suitable combination with a great degree of flexibility. For example, step 1706 of FIG. 13*a* initially can select the lowest noise available transmission frequency. Based on the training sequence, step 1712 can determine the packet error rate. If the packet error rate is too high, the baud rate can be specified to a lower value and training failure at 1714 can cause the procedure to return to 1706 for a new iteration at the lower baud rate.

One approach with respect to increasing operational time when using an inground battery is to increase size of the battery. Referring to FIG. 1 and in one embodiment, a battery pack can be carried, for example, by pipe section N to provide an ample level of available power. Additional measures, however, can also be taken with respect to conserving battery power.

Referring to FIG. 1, transceiver 64 can transmit a dipole signal 66 through the ground for purposes such as, for example, above ground locating and depth detection. Of course, the transmission of a dipole signal will consume battery power in the downhole transceiver. As an example, a typical dipole transmitter increases battery consumption by about 0.35 watts, when actively driving a dipole antenna. When not driving the antenna or coupling a signal onto the drill string, the power consumption of transceiver 64 can drop to about 0.15 watts; while still allowing power for sensors and processing activity. Power consumption of downhole transceiver 704 (FIG. 10*a*) will increase by about a modest 0.1 watts for purposes of driving the drill string, for example, using a current transformer or electrically isolating gap to couple a signal onto the drill string.

Figure 13B:
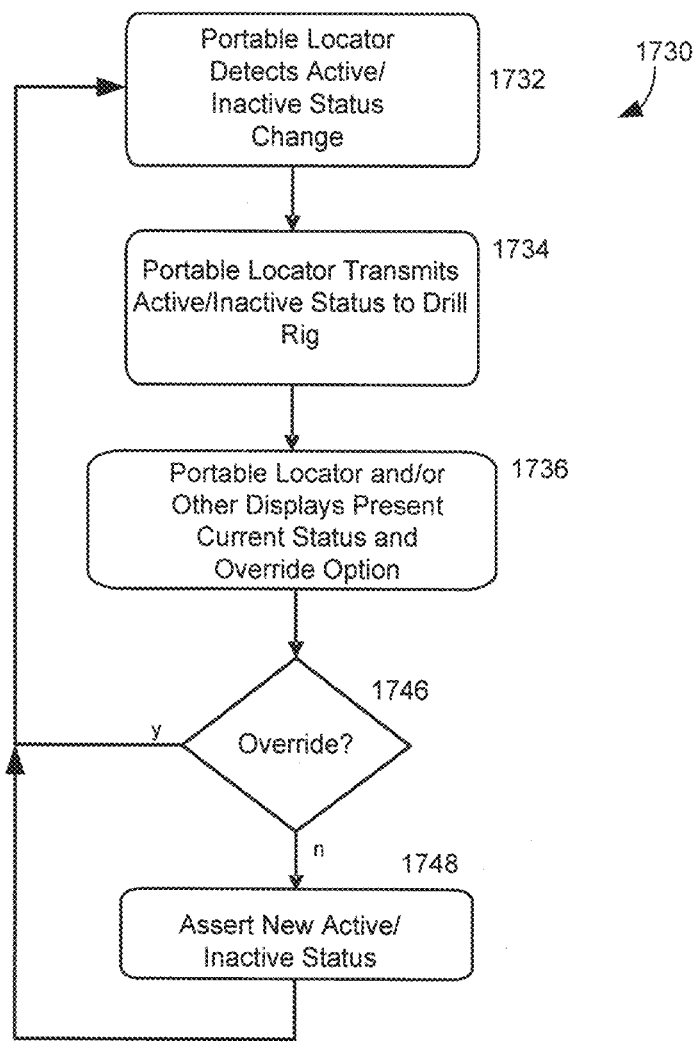
FIG. 13b is a flow diagram of an embodiment of a method for dynamically/automatically control the transmission of a locating signal.

Referring to FIG. 13*b*, a flow diagram, indicated by the reference number 1730, illustrates an embodiment of a method that dynamically and automatically controls transmission of a locating signal. At 1732, the walkover locator automatically monitors whether the walkover locator is in an active or inactive state. The locator is actively engaged in receiving and using the locating signal in the active state. In the inactive state, however, the locator can shut down components and/or processes that are involved in detection and processing of the locating signal. Monitoring can be performed in any suitable manner. For example, accelerometer 520 (FIG. 6) can readily detect any movement of the locator. If the locator is not moving based on the accelerometer readings for some period of time such as, for example, two minutes, the inactive state can be invoked or reasserted. As another example, proximity of the locator to the ground can be detected, for example, using an ultrasonic sensor. If the locator is sitting stationary on a surface such as the surface of the ground for some relatively short period of time such as, for example, two minutes, the inactive state can be invoked or reasserted. Once a change in the state is detected, operation proceeds to 1734 at which time a status indication can be transmitted to the drill rig via telemetry signal 92 (FIG. 1) that is indicative of a new active/inactive status. Responsive to the new status indication, at 1736, the current status can be presented on one or more displays in the system, as will be further described.

Figure 13C:
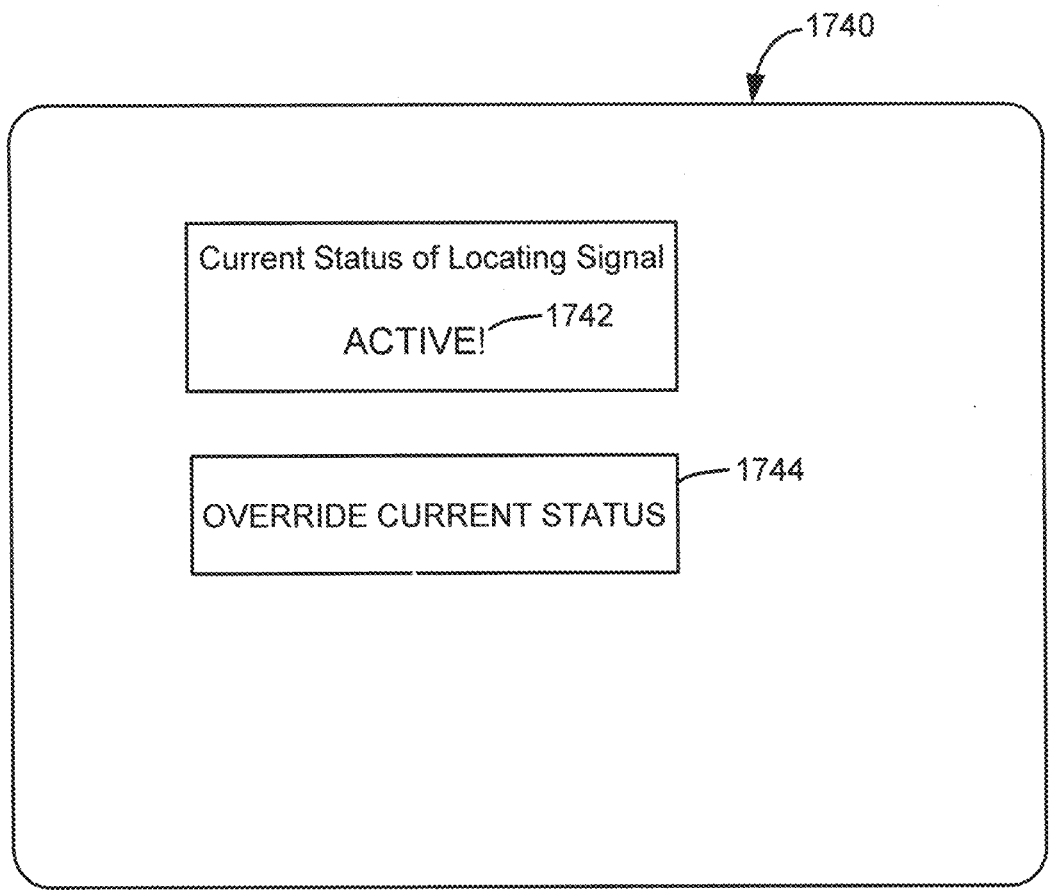
FIG. 13c is a screenshot showing an embodiment of the appearance of indicating the active/inactive status of a locating signal and the capability to change the current status.

Referring to FIG. 13*c* in conjunction with FIG. 13*b*, the former illustrates an embodiment of a screen shot that can be presented on a display 1740 responsive to step 1736 and which can be representative of screen 44 at the drill rig, screen 86 on device 80, and/or any suitable display in system 10. The display can indicate the current automatically selected active or inactive status 1742 of the locating signal and can further provide an active/inactive locating signal override selection 1744 for selective switching of locating signal 66 between the active and inactive states. This manual selection can serve to override any automatically selected current status of the locating signal. At 1746, the override selection is monitored. If override is selected, the current status of the locating signal is not changed and operation returns to 1732. If override is not selected, operation proceeds to 1748 which asserts the new active/inactive status. Operation can then return to 1732. Responsive to changing the active/inactive status at display 44 of the drill rig, a command can be transmitted down the drill string to downhole transceiver 56 (FIG. 6) such that the downhole transceiver can respond appropriately. If the operator is aware that the portable device is about to lose telemetry communication with the drill rig, the operator can ensure that the locating signal is set to an active status prior to telemetry loss. The operator may choose to utilize override selection 1742 in other situations. For example, the operator may wish to place the locator on the ground in a stationary position and observe progress of the boring tool on the locator display. If the locating signal becomes inactive, the operator can use override selection 1744 to cause the downhole transceiver to resume transmitting the locating signal. Override selection 1744 can also be useful when a drill rod is added to the drill string since this can comprise a considerable period of time. Many operators choose to confirm the position and depth of the boring tool prior to adding a drill rod. Upon completion of this confirmation, the operator at either the drill rig or portable locator can instruct the locating signal to go inactive to conserve downhole battery power.

Accordingly, unless there is an active need for dipole signal 66 such as, for example, obtaining a depth measurement, uphole transceiver 702 can command downhole transceiver 704 to shut off the dipole antenna transmitter to conserve battery power. Applicants recognize that a power savings of at least 20% can be achieved when not transmitting the dipole signal and transmitting data as an electrical signal on the drill string in accordance with the teachings that have been brought to light herein. In this regard, the relationship between battery life and power savings is generally nonlinear such that this power savings can translate into a significantly greater percentage increase in battery life. Furthermore, the downhole transceiver or a remote station, if used, can identify characteristics of the dipole signal to locator 80, thus retaining depth accuracy of the locator. Thus, power saving characteristics of the dipole signal can be changed on-the-fly based on the drilling environment at hand such as, for example, extreme depth or high levels of noise/interference. When walkover locating is impractical such as, for example, during a river crossing, the uphole transceiver can even instruct the downhole transceiver to turn off the dipole antenna until further notice in order to conserve battery power, thereby forcing the downhole transceiver to at least shut down transmission of locating signal 66 (FIG. 6) to initiate an inactive mode of the locating signal.

Still addressing aspects of power conservation, the downhole transceiver can be configured to enter a sleep mode responsive to detection of no movement for some period of time. This time period can be based on a default time period such as, for example, 10 minutes and/or can be programmable. During the sleep mode, the downhole transceiver can monitor roll orientation and awake responsive to detection of rotation. In an embodiment, the downhole transceiver can periodically listen, using receiver 802 (FIG. 10a), to the drill string to check for any commands from the uphole transceiver and awaken responsive to detecting a command. Upon awakening, the downhole transceiver can reinitiate the same status for the locating signal as when it went to sleep. The latter feature is also useful, for example, in the event that the drill rig encounters mechanical difficulties and may be inoperable for some period of time. In the event that a drill rod has broken and the downhole transceiver goes to sleep, communication via the drill string can be maintained by pushing the drill string to reduce the gap across the break and reinitiating communication. The locating signal can then be activated such that the boring tool can be recovered from the ground. Generally, the drill rig will have sufficient transmission power to reach the downhole transceiver. It should be appreciated that portable device 80 can also be configured to enter a sleep mode. Responsive to the operator shutting down the portable device and/or the portable device entering a sleep mode, the portable device can send an inactive status command to the drill rig such that the locating signal can be shut down.

As discussed above with reference to FIG. 1 and with additional reference to FIG. 6, modulation of locating signal 66 is not required. In an embodiment which transmits locating signal 66 without modulation, at least from a practical standpoint as a pure tone, Applicants recognize that enhanced depth range and/or homing range can be provided for a given level of transmission power that is applied to the locating signal. The enhanced capability can be attributed to factors including avoiding the diversion of carrier power to modulation side lobes as well as the ability to apply very narrow bandwidth filtering for purposes of receiving the pure tone at locator 80. The bandwidth for such a narrow band filter can be, for example, 0.5 Hz to 1 Hz. It is noted that the lower limit of the range affects response time. Stated in a different way, by transmitting an unmodulated carrier for a given depth range and/or a given homing range, the transmission power applied to locating signal 66 can be reduced at least for purposes of conserving battery power. Of course, the system of FIG. 1 provides for simultaneous modulation of the electromagnetic locating signal and the downhole signal. By shifting data, for example, produced by downhole sensors from modulation on the electromagnetic locating signal to modulation on the downhole signal traveling up the drill string, the electromagnetic locating signal can more closely approach or approximate the depth or reception range that would be provided by a pure tone, unmodulated locating signal.

In an embodiment, portable/walkover locator 80 can provide for automatic and/or manual selection of dipole transmission power and/or frequency by conveying selection information to the drill rig via telemetry signal 92. At the drill rig, uphole transceiver 600 can send selection commands to the downhole transceiver to cause transmission of locating signal 66 accordingly. Since accurate depth determinations depend on both the transmission frequency and the dipole strength, the depth can be determined by any suitable component of the system, including but not limited to the portable locator and the uphole transceiver. In an embodiment, portable locator 80 can automatically and/or manually be instructed to monitor characteristics of received dipole signal 66 such as, for example, signal strength. If the signal to noise ratio falls below a particular threshold, the portable locator can then notify the operator and/or automatically send instructions, as described above, with the purpose of improving the signal to noise ratio. Such automatic monitoring of the dipole signal as well as dipole signal reconfiguration can be performed in the background with no awareness needed on the part of the operator of the portable locator. For example, responsive to detection of signal to noise ratio degradation, the portable locator can internally initiate a scan of other available frequencies for the dipole signal which determines the current signal to noise ratio associated with the other available frequencies and, thereafter, selects the frequency with the highest signal to noise ratio. In an embodiment, sufficient degradation of the locating signal, when it is modulated, can be detected based on an inability to decode roll orientation information, pitch orientation information and/or other status information from the locating signal. Such degradation of the locating signal can occur, for example, in a high interference environment.

Figure 14:
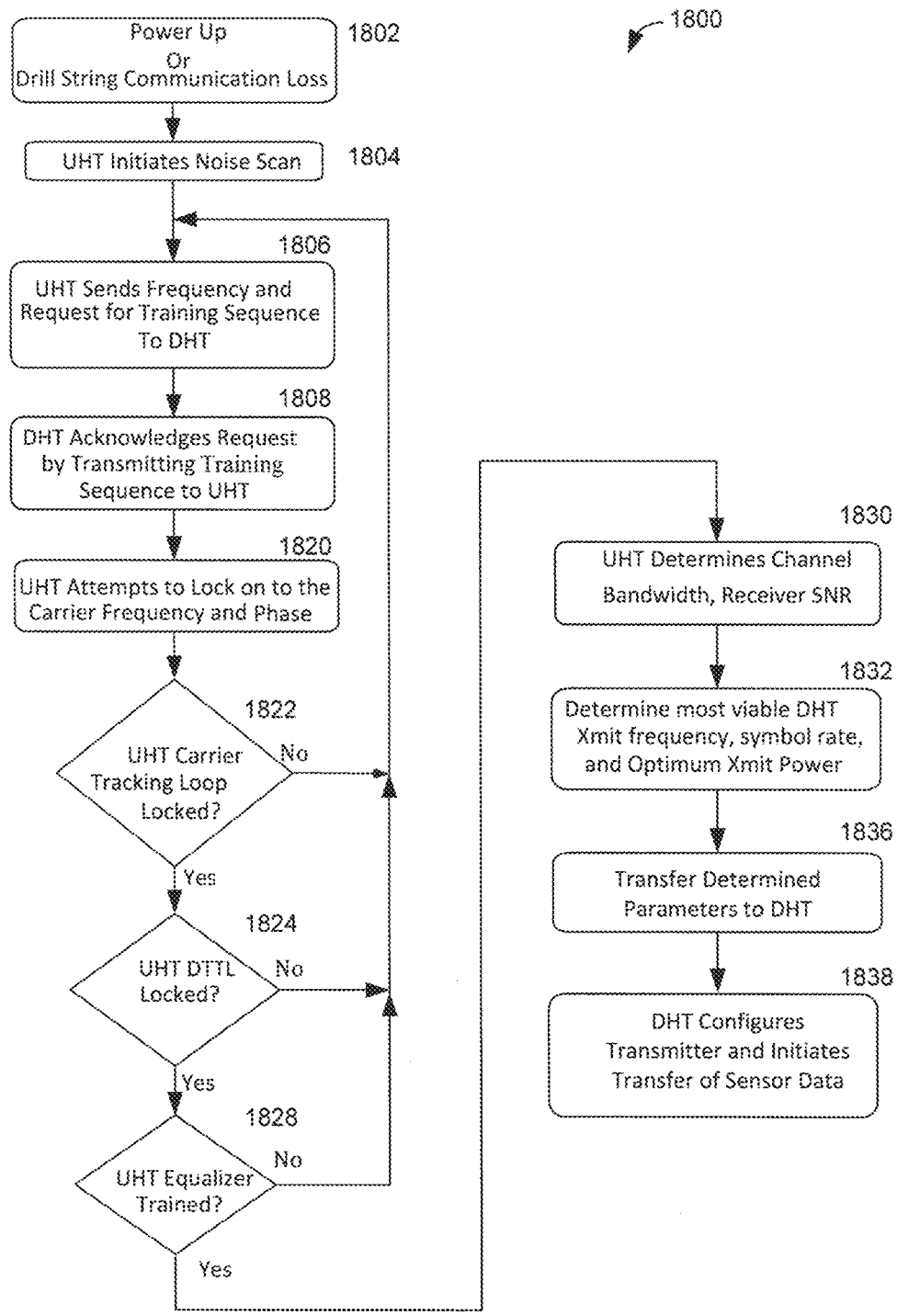
FIG. 14 is a flow diagram of an embodiment of a method for cooperative operation of the uphole and downhole transceivers of the present disclosure.

FIG. 14 is a flow diagram which illustrates an embodiment of a method, generally indicated by the reference number 1800, that is applicable to the operation of uphole transceiver 702 of FIG. 10*a* in cooperation with downhole transceiver 704 of FIG. 10*a*. The method is particularly directed to startup as well as responding to a communication loss that takes place during normal operation. The method can start at 1802 with power up or detection of communication loss. At 1804, the uphole transceiver scans for noise using one of the methods discussed above. Generally, this step is performed with the uphole and downhole transmitters off. At 1806, the uphole transceiver sends a command to the downhole transceiver that specifies a transmission frequency for the downhole transceiver to use and requests the downhole transceiver to transmit the training sequence which is shown at 1404 in FIG. 10*b*. At 1808, the downhole transmitter can acknowledge the request by transmitting training sequence 1404 (FIG. 10*a*) to the uphole transceiver. At 1820, MPSK carrier tracking loop and demodulator 1004 (FIG. 10*b*) attempts to lock onto the carrier frequency and phase of the signal from the downhole transceiver. Step 1822 determines if the carrier tracking loop was successfully locked. If not, operation returns to step 1806. If the carrier tracking loop was successfully locked, operation proceeds to 1824. This latter step determines whether Data Transition Tracking Loop (DTTL) 1006 in the uphole transceiver has locked onto data symbols. If not, operation can return to step 1806. If the DTTL successfully locked, operation can proceed to 1828. At 1828, it is determined whether the uphole receiver was successfully trained responsive to the training sequence. If training was successful, operation proceeds to 1830 which determines at least the channel bandwidth and the signal to noise ratio at the uphole transceiver. At 1832, the uphole transceiver determines the most viable transmission frequency based, for example, on training results and channel characterization for use by the downhole transceiver as well as parameters that can include the symbol rate and an optimum transmission power that assures reliable communication in conjunction with power savings. It is noted that the selected transmission frequency may change at this point during operation as compared to the transmission frequency previously determined by step 1804. At 1836, the determined parameters are transferred to the downhole transceiver. At 1838, the downhole transceiver reconfigures for transmitter operation based on the determined parameters and begins normal operation by transmitting sensor data to the uphole transceiver.

Figure 15:
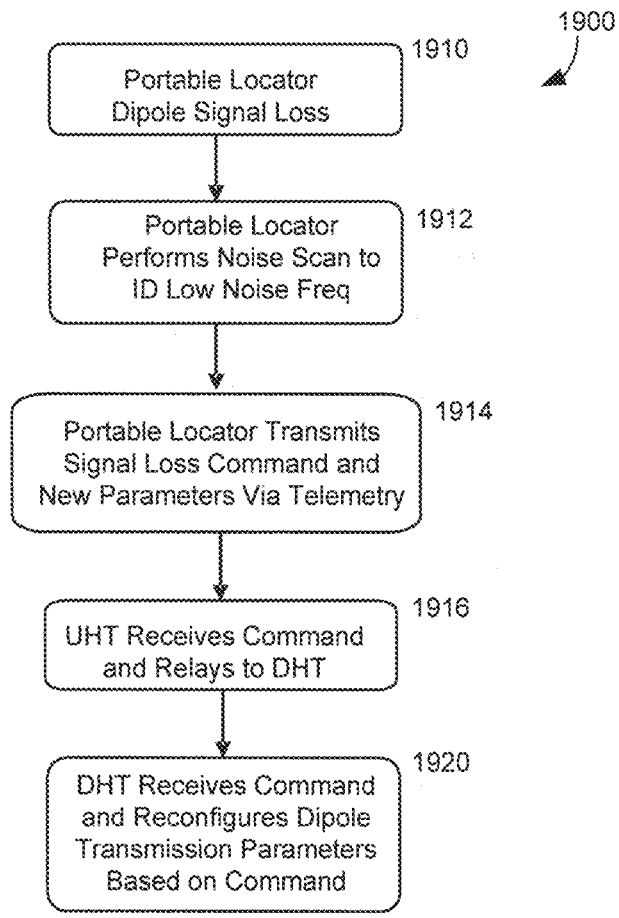
FIG. 15 is flow diagram of an embodiment of a communication protocol method between the downhole transceiver and a portable locator of the present disclosure.

FIG. 15 is a flow diagram which illustrates an embodiment of a method, generally indicated by the reference number 1900, that is representative of communication protocol between portable locator 80 and downhole transceiver 702 for purposes of maintaining reception of locating signal 66 (FIGS. 1 and 6) by the portable locator as transmitted from the downhole transceiver. At 1910, loss of locating signal 66 or sufficient signal degradation is detected by the portable locator. In an embodiment, degradation of the locating signal can be determined by a bit error rate (BER) that is tracked by the locator as the locating signal is received. Signal loss can be indicated responsive to the bit error rate violating a maximum BER threshold. In another embodiment, signal degradation can be based on the determination of a signal to noise ratio (SNR) for the locating signal with signal loss being indicated responsive to the signal to noise ratio violating a minimum SNR. In some embodiments, more than one aspect of signal degradation can be monitored such as, for example, BER and SNR. By way of non-limiting example, thresholds for establishing unsuitable signal quality can be 5 dB for SNR and 0.2 (20 percent) for BER in the context of any technique described herein. Of course, a loss of signal wherein the signal is no longer detectable violates these values. Any suitable technique can be employed for purposes of monitoring the quality of the locating signal. At 1912, the portable locator performs a noise scan to identify an available transmission frequency that exhibits the lowest noise level such as, for example, as described in above incorporated U.S. Published Patent Application no. 2011-0001633. For example, in one embodiment, a discrete Fourier transform (DFT) can be applied to determine the noise that is present at the frequency of interest. It should be appreciated that any suitable technique can be employed including, for example, the Goertzel filter or, as another example, wavelet transformation. At 1914, the portable locator transmits a signal loss command via telemetry signal 92 (FIG. 1) that identifies new parameters for locating signal 66, the new parameters can include, but are not limited to transmission power, carrier frequency, baud rate and modulation mode. For example, the lowest noise available carrier frequency can initially be selected along with an appropriate baud rate. If the error rate is too high for the selected baud rate, the baud rate can be lowered and the error rate re-determined. In the event that the baud rate becomes too low, a different modulation mode can be selected. Selection of a new modulation mode can be performed in any suitable manner. By way of non-limiting example, another modulation mode that can be selected is orthogonal frequency-division multiplexing (OFDM) in which closely spaced orthogonal sub-carriers can be used to carry data on multiple parallel data streams or channels in a manner that is known in the art. Thus, many non-interfering frequencies can be used with a relatively slow symbol rate for higher noise immunity, by spreading the data across multiple channels. It is noted that for maximum depth and homing range, the modulation mode can specify that the carrier is not modulated or is essentially a pure tone. At 1916, the uphole transceiver receives the signal loss command via telemetry and relays the command to the downhole transceiver. At 1920, the downhole transceiver receives the signal loss command and reconfigures the dipole transmission parameters accordingly.

Referring again to FIG. 1, it should be appreciated that system 10 incorporates a communication system that is accompanied by numerous benefits. This communication system is made up of the uphole transceiver located at the drill rig, the downhole transceiver located downhole proximate to the inground tool and the telemetry transceiver forming part of the walkover locator to form a first bidirectional communication link 2000 between the uphole transceiver and the downhole transceiver which uses the drill string as an electrical conductor to provide communication therebetween. A second bidirectional communication link 2002 is formed between the uphole transceiver and the telemetry transceiver of the walkover locator which employs wireless electromagnetic communication. Further, at least a unidirectional communication link 2004 is formed from the downhole transceiver of the inground tool to the walkover locator. These communication links provide a number of communication modes including a first communication mode from the downhole transceiver to the uphole transceiver at the drill rig via the drill string using first bidirectional communication link 2000. A second communication mode is provided from the downhole transceiver to the uphole transceiver via unidirectional communication link 2004, the telemetry transceiver at the walkover locator and second bidirectional communication link 2002. The communication modes can be managed by a communication controller/manager 2010 forming part of uphole transceiver 702 and which can form part of processing arrangement 46 at the drill rig such that the system can respond dynamically and automatically to any faults that are present in the system.

Figure 16:
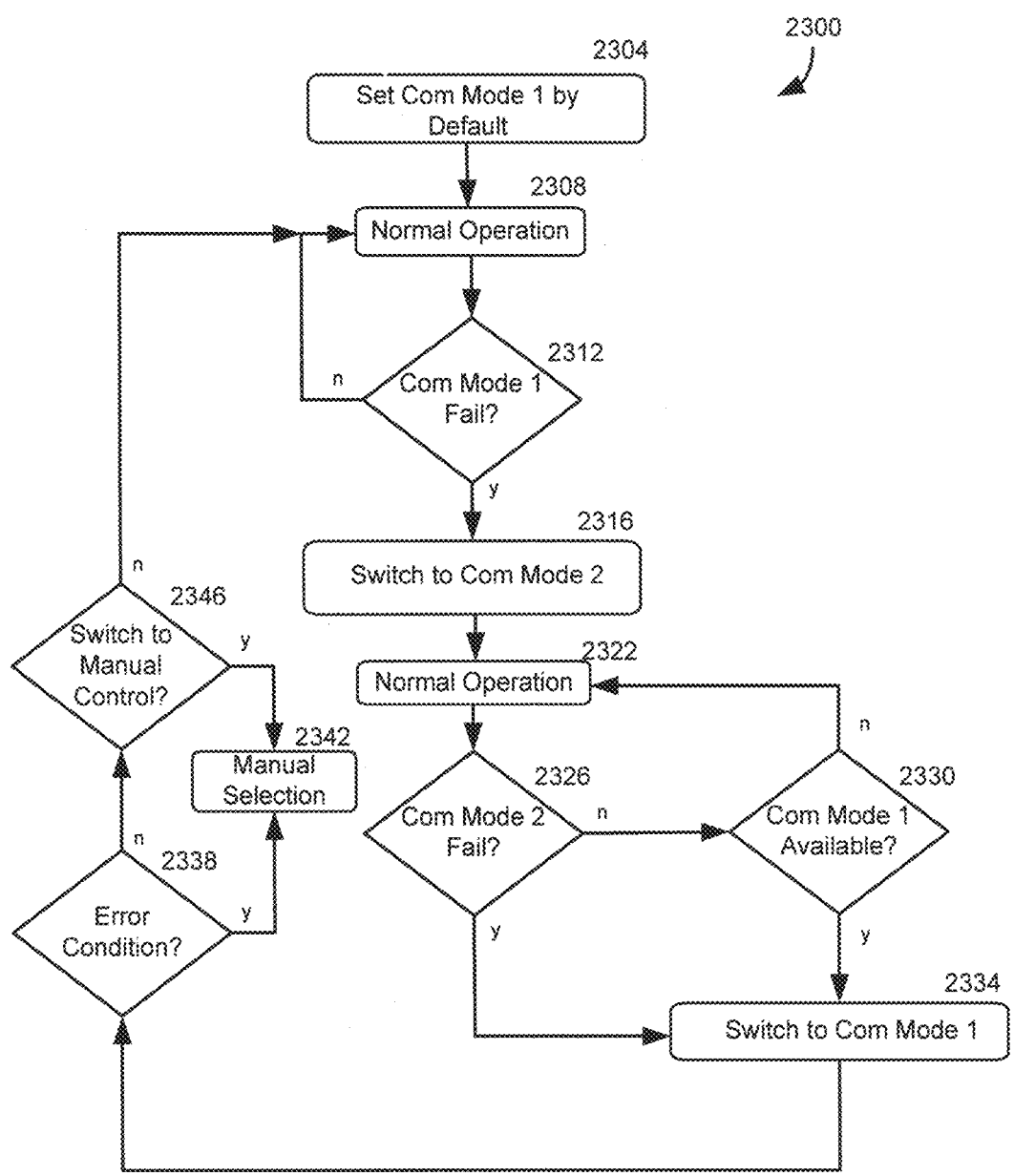
FIG. 16 is a flow diagram of an embodiment of a method for operating a communication controller.

Referring to FIG. 16 in conjunction with FIG. 1, the former illustrates an embodiment of a method for the operation of communication controller 2010 by way of non-limiting example and generally indicated by the reference number 2300. During system initiation at 2304, the controller can be configured to select the first communication mode as a default mode. Normal operation is entered at 2308. The status of communication mode 1 is then monitored at 2312 and can be determined in any suitable manner. For example, a failed status can be assigned responsive to a complete loss of signal and/or in the event that signaling in either direction between the uphole transceiver and the downhole transceiver fails to meet a given signal to noise ratio and/or exceeds a given bit error rate. As long as communication mode 1 remains healthy, normal operation can proceed at 2308. If communication mode 1 is not healthy based on the determination at 2312, communication mode 2 is entered at 2316 for communication from the downhole transceiver to the uphole transceiver via locator 80. Normal operation then resumes at 2322. As part of normal operation, step 2326 monitors for a failure condition of communication mode 2. If no abnormal condition is detected with respect to communication mode 2, a test is performed at 2330 to determine whether communication mode 1 is again available. If communication mode 1 is not available, normal operation resumes at 2322. On the other hand, if communication mode 1 is available, the controller switches to communication mode 1 at 2334. Returning again to step 2326, if communication mode 2 fails, the system also switches to communication mode 1 at 2334. If the switch to communication mode 1 is unsuccessful, an error condition can be determined at 2338, which then transfers to a manual mode at 2342. If no error condition is determined at 2338, operation can then proceed to 2346 which can provide an opportunity for the operator to switch to manual control, if so desired, at 2346. If the operator does not select manual control, operation returns to 2308. It should be appreciated that method 2300 can run in the background during operation of the system. In doing so, the method can execute at a rapid rate of multiple iterations per second.

Applicants submit that the system and methods described herein provide benefits that have not been seen heretofore. For example, the disclosed advanced communication system conveniently enables bidirectional communication by reliably transferring data as an electrical signal directly on existing drill strings without modification, but by using advanced communication techniques that have never been recognized as applicable in the context of the present system, and with no need for time consuming constraints imposed by prior art techniques such as, for example, a wire-in-pipe arrangement. Applicants recognize the benefits of using asymmetric power transmission levels in the disclosed drill string communication system. That is, transmission from the uphole transceiver to the downhole transceiver at high power levels provides the ability to reliably establish communication to the downhole transceiver while transmission from the downhole transceiver to the uphole transceiver can be performed using a set of optimized parameters including a reliable low/minimized power level to satisfy the competing concerns of reliable communication and conservation of battery power. The system of the present disclosure can provide additional benefits through the selective transmission of a pure tone locating signal for homing and/or locating purposes from the downhole transceiver to a portable above ground locator while allowing the simultaneous transmission of data up the drill string, modulated directly onto the drill string as an electrical conductor. Applicants are unaware of any prior system that has been configured in this manner. It is believed that the disclosed system and associated methods have never been seen at least for the reason that the ability to provide reliable communication at normal or extended ranges by direct electrical signal transmission on the drill string introduces challenges that are more than difficult to resolve and that one of ordinary skill in the art would immediately deem the combined set of challenges to be effectively insurmountable.

Appendix A

Derivation for Linear Estimator with Minimum Mean Square Error.

Given two random variable vectors $\{x, y\}$ of size L×1 and zero mean, the linear and unbiased estimator for x is of the form $$\hat{x} = Wy \qquad \text{EQ (A1)}$$

Where W is some constant matrix of size L×L. Note, that a bold font is used for vector variables and capital letters in bold font for matrix variables. The constraint for the estimator in EQ(A1) is that it must have minimum mean square error (MMSE.) Therefore the estimator must satisfy the following constraint.

$$\min_{W} E\{|x-\hat{x}|^2\} \qquad \text{EQ (A2)}$$

Because $\{x, \hat{x}\}$ has zero mean, the MMSE of EQ (A2) is the sum of the individual MMSE. Let i denote the $i^{th}$ sample in the vector then the individual MMSE is $$J(w_i) \triangleq E\{|x(i) - \hat{x(i)}|^2\} = E\{|x(i) - w_i y|^2\} \qquad \text{EQ (A3)}$$

Note $w_i$ is the $i^{th}$ row of matrix W. Expanding the square gives:

$$J(w_i) \triangleq E\{|x(i)|^2\} - w_i^* E\{x(i)y^*\} - w_i E\{x^*(i)y\} + w_i E\{yy^*\} w_i^* \qquad \text{EQ (A4)}$$

Minimizing the function in EQ(4A) by partial differentiation with respect to $w_i$ and setting it equal to zero:

$$\frac{\partial J(w_i)}{\partial w_i} = 0 = -2R_{xy,i} + 2w_i R_y \qquad \text{EQ (A5)}$$

Where $R_{xy,i} = E\{x(i)y^*\}$, $R_y = E\{yy^*\}$, Therefore, the optimum choice for $w_{o,i}$ which satisfies the linear, unbiased estimator of x with MMSE is $$w_{o,i} \cdot R_y = R_{xy,i} \qquad \text{EQ (A6)}$$

Collecting all the $\{w_{o,i}\}$, the full estimate is $$W_o R_y = R_{xy} \qquad \text{EQ (A7)}$$

When $R_y$ is a non-negative definite and positive-definite matrix, then EQ(A7) will have a unique solution as follows:

$$W_o = R_{xy} R_y^{-1} \qquad \text{EQ (A8)}$$

Therefore, equation EQ(A1) can now be rewritten as $$\hat{x} = Wy = R_{xy} R_y^{-1} y \qquad \text{EQ (A9)}$$

Now the estimator discussed in equations EQ 11a, EQ 11b and EQ 12 above can be solved for which is of the type:

$$y = Bx + n \qquad \text{EQ (A10)}$$

Matrix $R_y$ and $R_{xy}$ is recalculated using equation EQ(A10):

$$R_y = E\{yy^*\} = E\{(Bx+n)(Bx+n)^*\} = BR_x B^* + R_n \qquad \text{EQ (A11)}$$

$$R_{xy} = E\{xy^*\} = E\{(x)(Bx+n)^*\} = R_x B^* \qquad \text{EQ (A12)}$$

Where $R_x = E\{xx^*\}$ and since $R_n > 0$ (i.e. n is a zero mean random noise vector with covariance matrix $R_n = E\{nn^*\} > 0$), this yields $R_y > 0$. Therefore, $R_y$ is invertible.

Now the linear estimate of x with minimum mean square error can be determined from equations EQ(A8), EQ(A10), and EQ(A11) which is $$\hat{x} = R_x B^* (BR_x B^* + R_n)^{-1} y \qquad \text{EQ (A13)}$$

The foregoing description of the invention has been presented for purposes of illustration and description. It is not intended to be exhaustive or to limit the invention to the precise form or forms disclosed, and other embodiments, modifications and variations may be possible in light of the above teachings wherein those of skill in the art will recognize certain modifications, permutations, additions and sub-combinations thereof.

What is claimed is:

1. A system for performing an inground operation at least which utilizes a drill string extending from a drill rig to an inground tool as an electrical conductor to provide communication therebetween, said system comprising:
   a downhole transceiver located downhole proximate to the inground tool which is configured (i) to receive at least one sensor signal relating to an operational parameter of the inground tool, (ii) to generate a downhole signal that is transmitted to the drill rig on the drill string and which downhole signal is modulated based on the sensor signal, and (iii) to emanate an electromagnetic locating signal for above ground detection which locating signal is unmodulated at least by said sensor signal;
   an uphole transceiver located at the drill rig including an uphole receiver that is configured to receive the downhole signal from the drill string and to recover the sensor signal such that information relating to the operational parameter is available at the drill rig; and
   a walkover locator for receiving the electromagnetic locating signal to serve as at least one of a homing beacon and a tracking signal such that a detection range of the locating signal for a given transmission power without modulation is greater than the detection range of a modulated locating signal modulated by said sensor signal at the same, given transmission power.

2. The system of claim 1 wherein the downhole transceiver is configured to transmit the electromagnetic locating signal at least approximately as a pure tone and the walkover locator includes a narrow band filter that is centered on a carrier frequency of the electromagnetic locating signal to detect at least approximately no more than the pure tone.

3. The system of claim 1 wherein the walkover locator is configured for telemetry communication with the uphole transceiver at the drill rig at least for correlation of sensor related data transferred to the uphole transceiver on the drill string from the inground tool with walkover locator generated data transferred by an electromagnetic telemetry signal to the uphole transceiver.

* * * * *